United States Patent [19]
Kanegae

[11] Patent Number: 5,068,753
[45] Date of Patent: Nov. 26, 1991

[54] DATA REPRODUCING CIRCUIT FOR MEMORY SYSTEM HAVING AN EQUALIZER GENERATING TWO DIFFERENT EQUALIZING SIGNALS USED FOR DATA REPRODUCTION

[75] Inventor: Masahide Kanegae, Kawasaki, Japan
[73] Assignee: Fujitsu Limited, Kawasaki, Japan
[21] Appl. No.: 323,943
[22] Filed: Mar. 15, 1989

[30] Foreign Application Priority Data

Mar. 16, 1988 [JP] Japan .................................. 63-62769
Mar. 16, 1988 [JP] Japan .................................. 63-62770

[51] Int. Cl.⁵ ............................................. G11B 5/09
[52] U.S. Cl. ........................................ 360/46; 360/65
[58] Field of Search .................................. 360/46, 65

[56] References Cited

U.S. PATENT DOCUMENTS

| | | | |
|---|---|---|---|
| 4,093,965 | 6/1978 | Gish | 360/65 X |
| 4,635,143 | 1/1987 | Suzuki et al. | 360/65 X |
| 4,651,236 | 3/1987 | Ouchi et al. | 360/65 X |
| 4,757,395 | 7/1988 | Nishikawa | 360/65 X |
| 4,774,601 | 9/1988 | Ouchi et al. | 360/46 X |
| 4,786,989 | 11/1988 | Okamura | 360/65 X |
| 4,849,834 | 7/1989 | Allen | 360/46 X |
| 4,890,170 | 12/1989 | Inohana et al. | 360/46 X |
| 4,908,722 | 3/1990 | Sonobe | 360/46 X |

Primary Examiner—Roy N. Envall, Jr.
Assistant Examiner—Hung H. Bui
Attorney, Agent, or Firm—Staas & Halsey

[57] ABSTRACT

A data recording and reproducing circuit for a memory system, such as a magnetic disk memory system. The circuit includes a reflection type cosine equalizer and a data reproducing circuit. The equalizer includes a first equalizing circuit, having a first equalizing gain, and outputting a first equalized signal, and a second equalizing circuit having a second equalizing gain smaller than the first equalizing gain, and outputting a second equalizing circuit. The data reproducing circuit includes a differentiator for differentiating the first equalized signal, a window generating circuit for generating a window signal from the second equalized signal, and a data separator for discriminating the differentiated signal in response to the window signal to produce a pulsed reproduction signal.

11 Claims, 19 Drawing Sheets

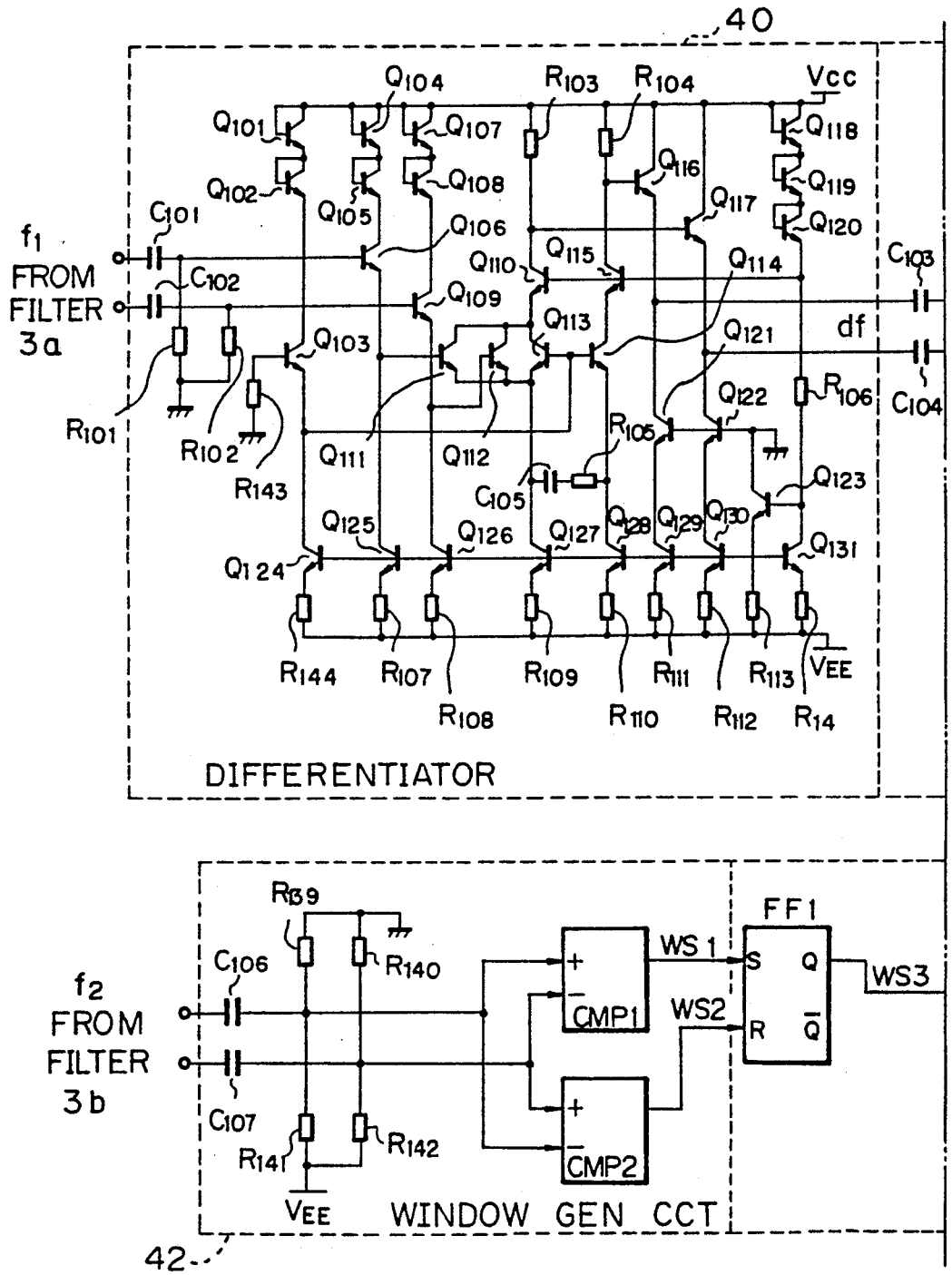

Fig. 9B
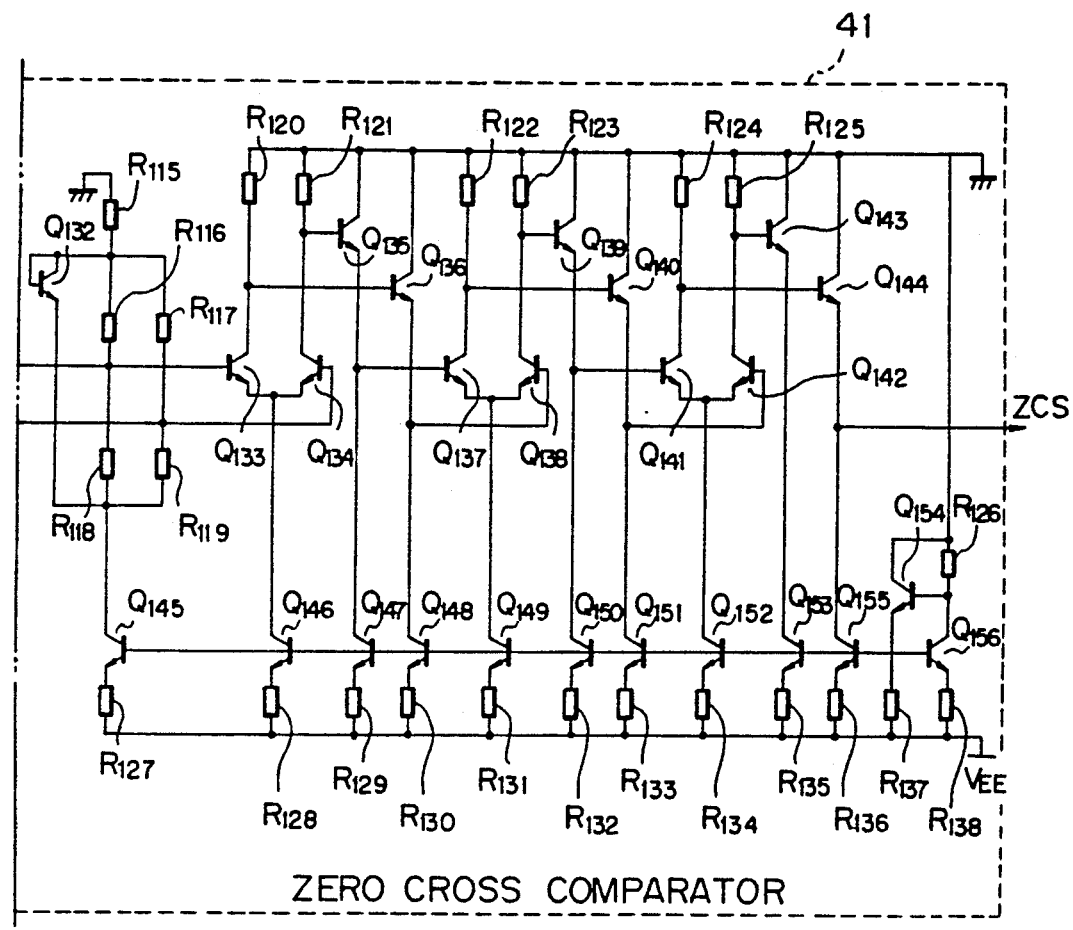
ZERO CROSS COMPARATOR
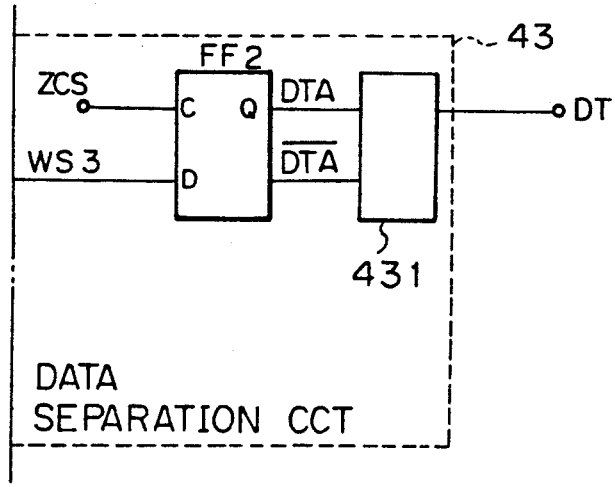
DATA SEPARATION CCT

DATA REPRODUCING CIRCUIT FOR MEMORY SYSTEM HAVING AN EQUALIZER GENERATING TWO DIFFERENT EQUALIZING SIGNALS USED FOR DATA REPRODUCTION

BACKGROUND OF THE INVENTION

1. Field of the Invention

The present invention relates to an improved data reproducing circuit used for a memory system having a reading head, such as a magnetic disk memory system, a magnetic tape memory system, an optical memory system, etc., and reproducing analog signals read from the head as digital reproduction signals, with a high accuracy.

2. Description of the Related Art

In memory systems, for example, a magnetic disk memory system, a magnetic tape memory system, etc., data is read from a magnetic recording medium, such as a magnetic disk, as analog signals, and accordingly, a magnetic reproducing circuit for reproducing the analog signals as digital signals is required. In such memory systems, since the memory density has been improved to improve the resolution of a signal, an equalizer for equalizing an analog output is used. If however, the equalizing ability is improved, the signal reproduction accuracy is reduced. This relationship will be described later with reference to the accompanying drawings.

Also, a differentiator in a data reproduction circuit provided as a circuit following the equalizer circuit, can not provide a stable differentiated result, due to the affects of noise, which result in a low signal reproduction accuracy

SUMMARY OF THE INVENTION

An object of the present invention is to provide a data reproducing circuit used for a memory system and including an equalizer, in which an accuracy of a reproduction signal is improved without an improvement in the equalization ability of the equalizer.

Another object of the present invention is to provide an equalizer, used for a data reproducing circuit, providing two different equalized signals.

Still another object of the present invention is to provide a differentiator used for a data reproducing circuit and providing a reliable differentiated value free from noise.

According to the present invention, there is provided a data reproducing circuit for a memory system having a data sensing head, including an equalizer receiving an analog signal from the head and varying an amplitude thereof in accordance with time, and generating first and second equalized signals from the received analog signal and a digital data reproducing circuit, operatively connected to the equalizer, for receiving the first and second equalized signals, differentiating the first equalized signal, generating a window signal when and during a time in which the second equalized signal exceeds a predetermined threshold level, and outputting a pulsed reproduction signal when the differentiated signal exceeds a predetermined level and the window signal exists.

According to another aspect of the present invention, there is also provided an equalizer for a data reproducing circuit in a memory system having a data sensing head, including a first equalizing signal generation circuit generating a first equalized signal f1 expressed by $f1 = f(t+\tau) - k_1\{f(t) + f(t+2\tau)\}$, where, $f(t)$ is a signal sensed by the head, $\tau$ is a delay time, and $k_1$ is a first equalizing gain a second equalizing signal generation circuit is also provided for generating a second equalized signal f2 expressed by $f2 = f(t+\tau) - k_2\{f(t) + f(t+2\tau)\}$, where, $k_2$ is a second equalizing gain.

According to still another aspect of the present invention, there is further provided a differentiator for a data reproducing circuit in a memory system having a data sensing head, including a window generation circuit for discriminating a signal from the head and having an amplitude of a predetermined threshold value, whereby a window signal is generated when the signal exceeds the threshold value. The memory system also includes a selective differentiating circuit, operatively connected to the window generation circuit to receive the window signal, differentiating another signal corresponding to the signal to be discriminated, and gating the differentiated signal by the window signal from the window generation circuit.

BRIEF DESCRIPTION OF THE DRAWINGS

Other objects and features of the present invention will be described in more detail with reference to the accompanying drawings, in which:

Figs. 8, 9A and 9B are circuit diagrams of the magnetic reproducing circuit shown in FIG. 7;

DESCRIPTION OF THE PREFERRED EMBODIMENTS

Before describing the preferred embodiments of the present invention, a prior art data reproducing circuit for a magnetic disk memory system, i.e., a magnetic reproducing circuit, will be described.

Figure 1:
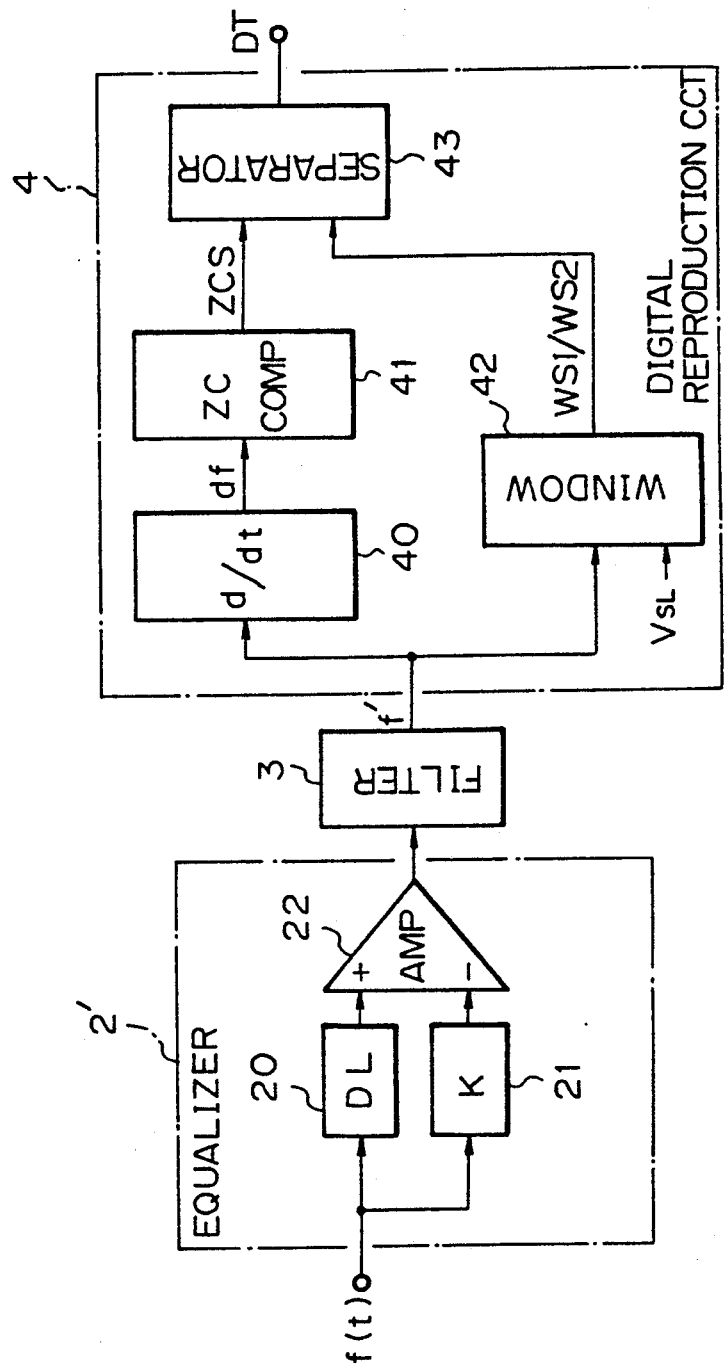
FIG. 1 is a circuit diagram of a prior art magnetic reproducing circuit.
Figure 2:
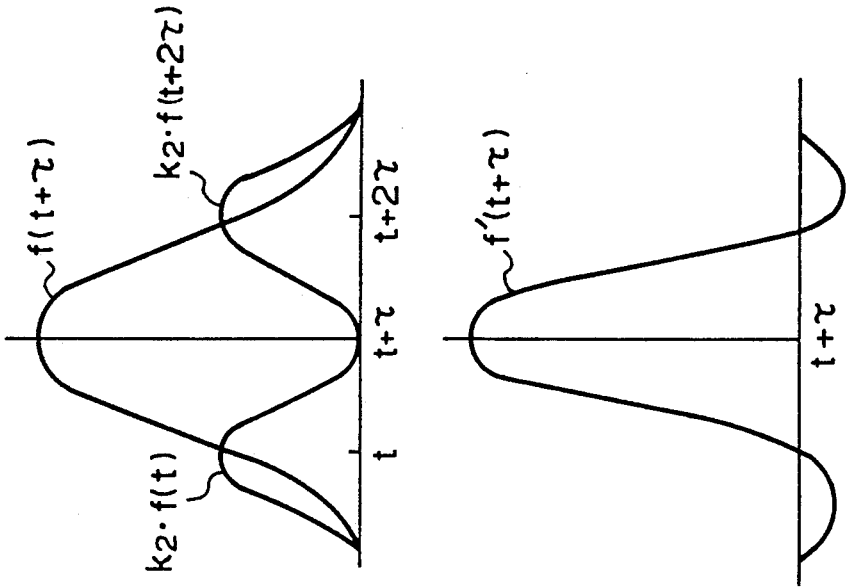
FIGS. 2 and 3 are waveform diagrams of the equalizing signals generated in the magnetic reproducing circuit shown in FIG. 1.
Figure 3:
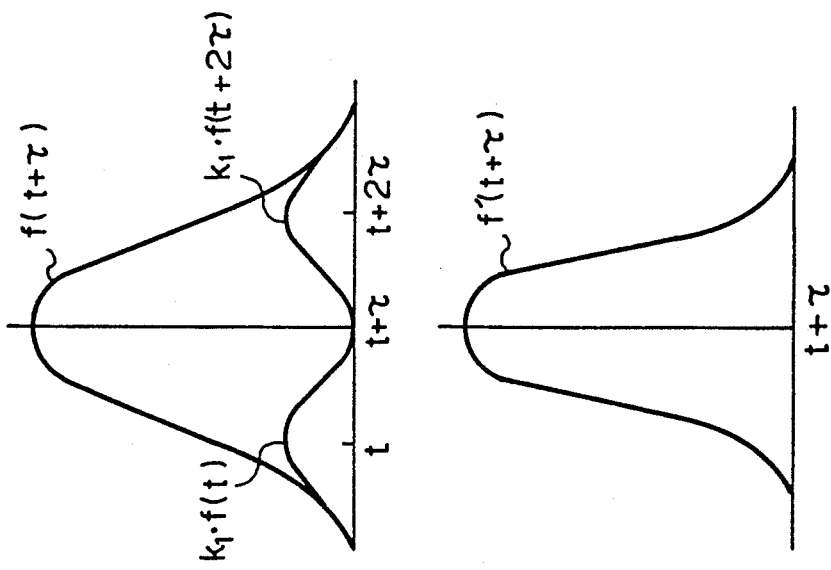

FIG. 1 is a circuit diagram of a prior art magnetic reproducing circuit. The magnetic reproducing circuit includes a reflection type cosine equalizer 2' for equalizing an analog output f(t) from a magnetic head (not shown), a low-pass filter 3 for rejecting noise of an equalized signal, and a digital data reproducing circuit 4 for obtaining a digital reproduction output DT from the equalized and filtered signal f'. The reflection type cosine equalizer 2' has a delay element 20 having an open output end, a gain adjustment circuit 21, and a differential amplifier 22 for subtracting an output from the gain adjustment circuit 21 from the output from the delay element 20. The input signal f(t) is delayed at the delay element 20 by a delay time $\tau$, and a delayed signal is supplied to a first input terminal of the amplifier 22. An input impedance of the amplifier 22 is very high, and the delayed signal supplied to the first input terminal is reflected to the delay element 20. The reflected signal is further delayed at the delay element 20 by the delay time $\tau$, and the further delayed signal is added to the gain adjustment circuit 21. The gain adjustment circuit 21 has a gain k, where $k \leq 1$. Namely, the first input terminal of the amplifier 22 receives a signal $f(t+\tau)$, and the gain adjustment circuit 21 receives signals $kf(t)$ and $kf(t+2\tau)$. As a result, as shown in FIGS. 2 and 3, the differential amplifier 22 calculates a difference between an analog output $f(t+\tau)$ obtained by delaying the analog output by the delay time $\tau$ at the delay element 20 and an output $k \cdot f((t) + k \cdot f(t+2\tau)$ from the gain adjustment circuit 21, to equalize the analog output Sf into an analog output $f'(t+\tau)$ having a sharp waveform. This waveform has a cosine shape.

The digital data reproducing circuit 4 has a differentiator 40 for differentiating the equalized and filtered signal f', a zero-cross comparator 41 for detecting a zero-cross point of the differentiated signal df, a window generating circuit 42 for slicing the equalized signal Sf' with a fixed slice level $V_{SL}$ to generate a window signal WS, and a data separation circuit 43 for separating a zero-cross signal ZCS by the window signal WS to obtain the digital reproduction signal DT.

Figure 4:
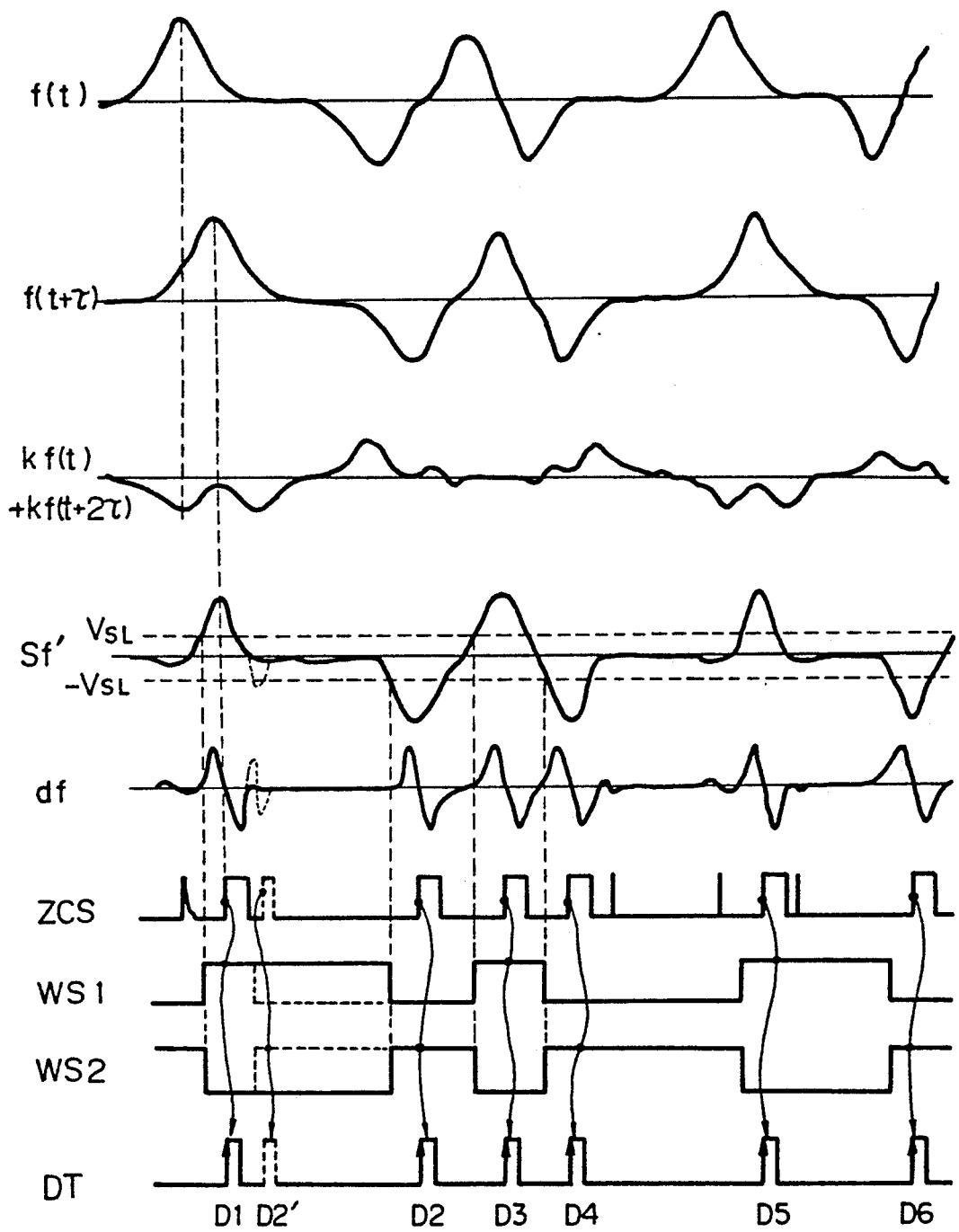
FIGS. 4 and 5 are waveform diagrams of the waveforms in the magnetic reproducing circuit shown in FIG. 1.

As shown in FIG. 4, the input signal f(t) from the magnetic head 1 is added to the reflection type cosine equalizer 2, and is delayed at the delay element 20 by the delay time $\tau$. Accordingly, the output $f(t+\tau)$ is supplied to the differential amplifier 22. At the same time, the gain adjustment circuit 21 outputs a gain adjusted signal of $k \cdot f(t) + k \cdot f(t+2\tau)$, since the delay element 20 is an open output terminal type, and the equalized signal Sf' shown in FIGS. 2 and 3 and FIG. 4 can be obtained by a differential operation of the differential amplifier 22. The equalized signal Sf' is supplied to the reproducing circuit 4 through the filter 3, is differentiated by the differentiator 40, and is zero-cross detected by the zero-cross comparator 41, to thereby output the zero-cross signal ZCS. The equalized signal Sf' is also sliced (discriminated) at fixed slice (threshold) levels $V_{SL}$ and $-V_{SL}$ in the window generating circuit 42, to generate two window signals WS1 and WS2 having reverse phases. The zero-cross signal ZCS is separated by the window signals WS1 and WS2, by the data separator circuit 43, to thereby output the digital reproduction signal DT.

Figure 5:
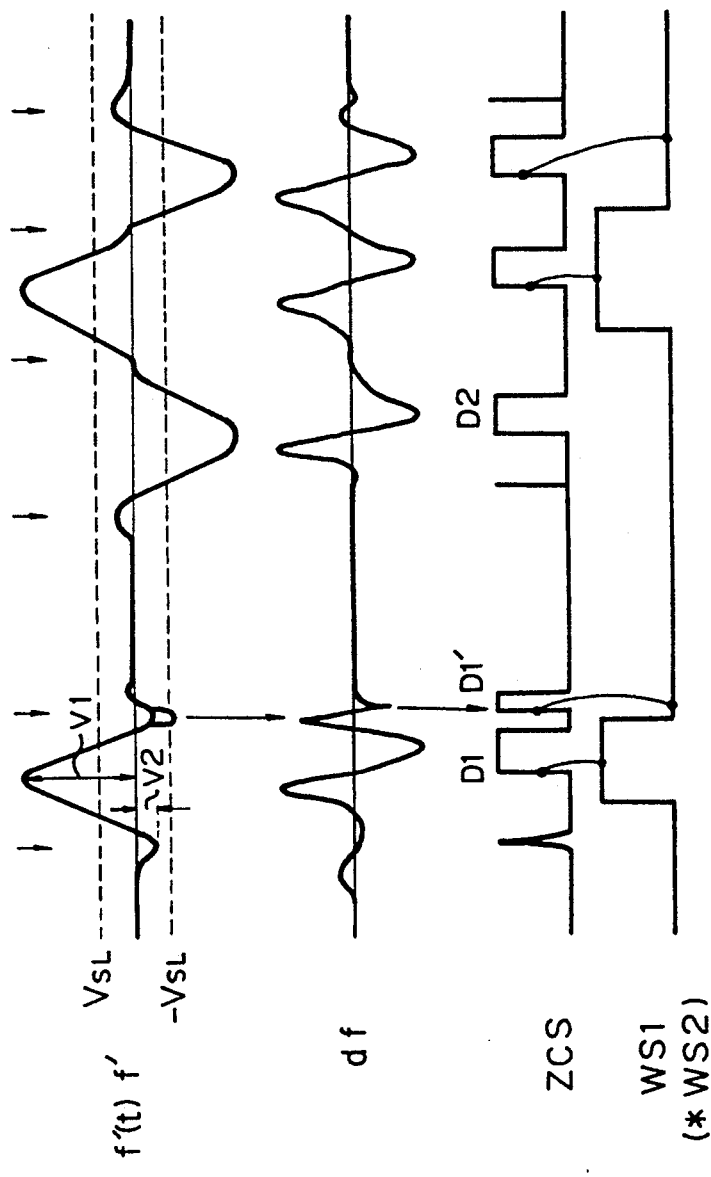

To improve the S/N ratio of the differentiator 40, a gain k of the equalizer 2 is increased to sharpen the waveform, as shown in FIG. 3. When the gain k is increased to increase an equalizing value, shoulder portions appear at two sides of an original waveform, and as a result, a voltage $V_1$ is decreased and a voltage $V_2$ increased as the equalizing value is increased, as shown in FIG. 3 and as indicated by arrows in FIG. 5. If a signal due to defects on a disk medium is superposed on the shoulder portion, the level of that signal may exceed the fixed slice level $V_{SL}$, as indicated by dotted curves in FIG. 4 and as shown in FIG. 5. In this case, as indicated by dotted curves in FIG. 4 and as shown in FIG. 5, erroneous data D1 due to the shoulder portions is reproduced in addition to normal data D1, and correct data D2 may be omitted. For this reason, in the prior art, an improvement of the S/N ratio of the differentiator and the removal of an erroneous reproduction signal due to medium defects are conflicting requirements.

The above defects may occur in other magnetic systems, such as the magnetic tape memory system and optical disk memory system, etc.

The present invention is intended to overcome the above problems and provides a data reproducing circuit which can simultaneously achieve an improvement of the S/N ratio of the differentiator and a removal of an erroneous reproduction signal due to medium defects.

Figure 6:
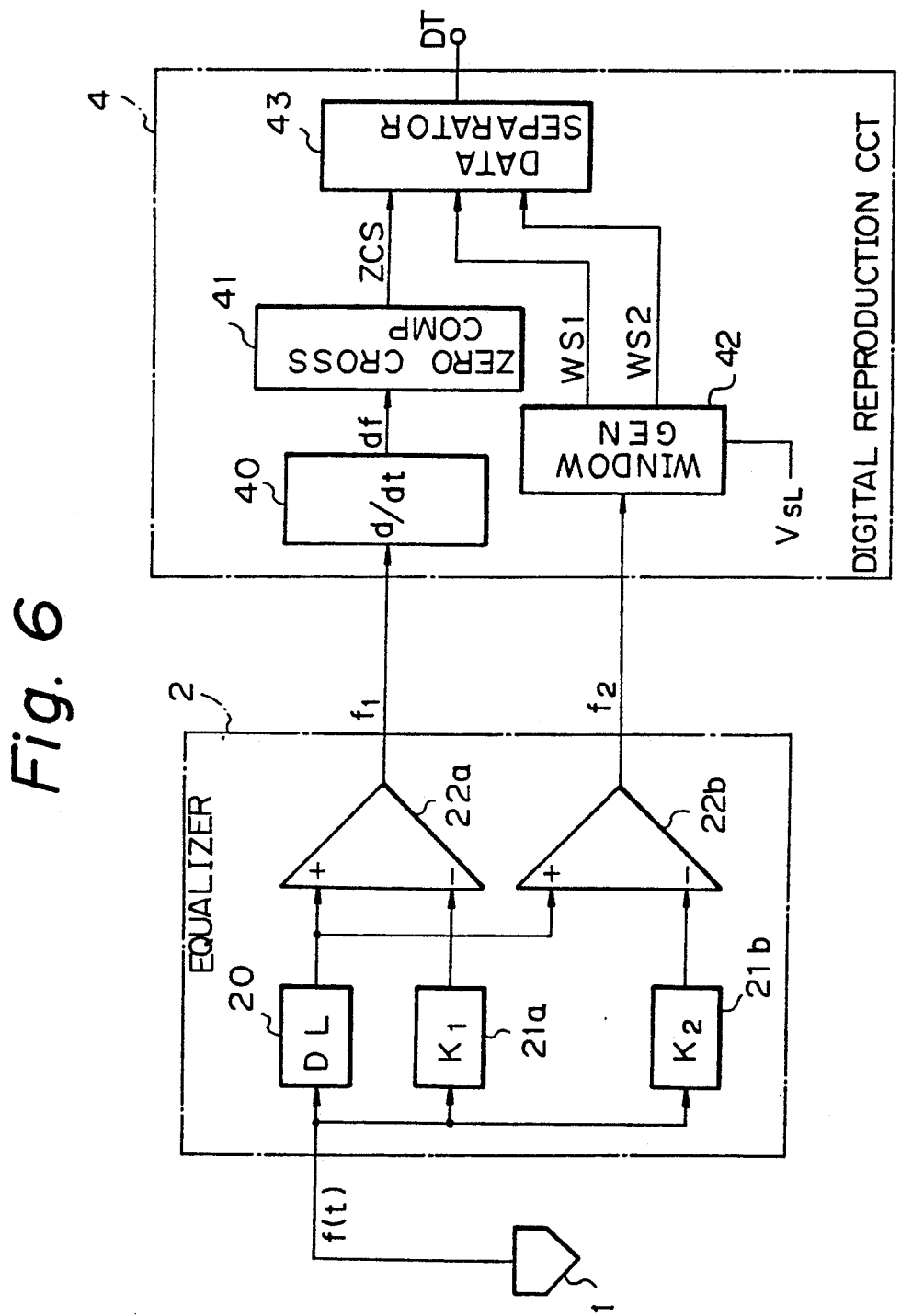
FIG. 6 is a block diagram of a data reproducing circuit for a memory system in accordance with the present invention.

FIG. 6 is a block diagram of the present invention. In the drawings, a data reproducing circuit of the present invention has a reflection type cosine equalizer 2 including a delay circuit 20, a pair of gain adjustment circuits 21a and 21b, a pair of differential amplifiers 22a and 22b, a digital data reproducing circuit 4 including a differentiator 40, a zero-cross comparator 41, a window generating circuit 42, and a data separation circuit 43. The circuit construction of the digital reproducing circuit 4 is the same as the circuit construction shown in FIG. 1, except that the data reproducing circuit 2 is different from the data reproducing circuit 21 shown in FIG. 1.

The reflection type cosine equalizer 2 receives data Sf from a data reading head 1, for example, a magnetic head in a magnetic disk memory system, and generates two equalized signals $f_1$ and $f_2$ having different gains $k_1$ and $k_2$, to enable the digital data reproducing circuit 4 to use the equalized signals expressed by the following formulas:

$$f_1 = k_1 \cdot f(t) + k_1 \cdot f(t+2\tau) \quad (1)$$

$$f_2 = k_2 \cdot f(t) + k_2 \cdot f(t+2\tau) \quad (2)$$

The mode of generation of the equalized signals $f_1$ and $f_2$ is the same as that described above with reference to FIG. 1.

The first equalized signal $f_1$ is supplied to the differentiator 40 and differentiated, and zero-cross points of the differentiated signal are detected by the zero-cross comparator 41. The second equalized signal $f_2$ is used to generate windows WS1 and WS2 at the window generating circuit 42. A differentiation with a high S/N ratio can be performed by using the equalized signal $f_1$ having the large equalizing gain $k_1$, and windows can be generated using the equalized signal $f_2$ having a small equalizing gain $k_2$. Namely, the window is made generated regardless of the S/N ratio. Therefore, the defects accompanying the generation of the windows WS1 and WS2 can be prevented, and an erroneous reproduction signal due to medium defects can be stably removed.

Conversely, the requirement that the gain $k_2$ be set greater than the gain k, exists. The present invention can be applied to systems in which such a requirement exists.

Figure 7:
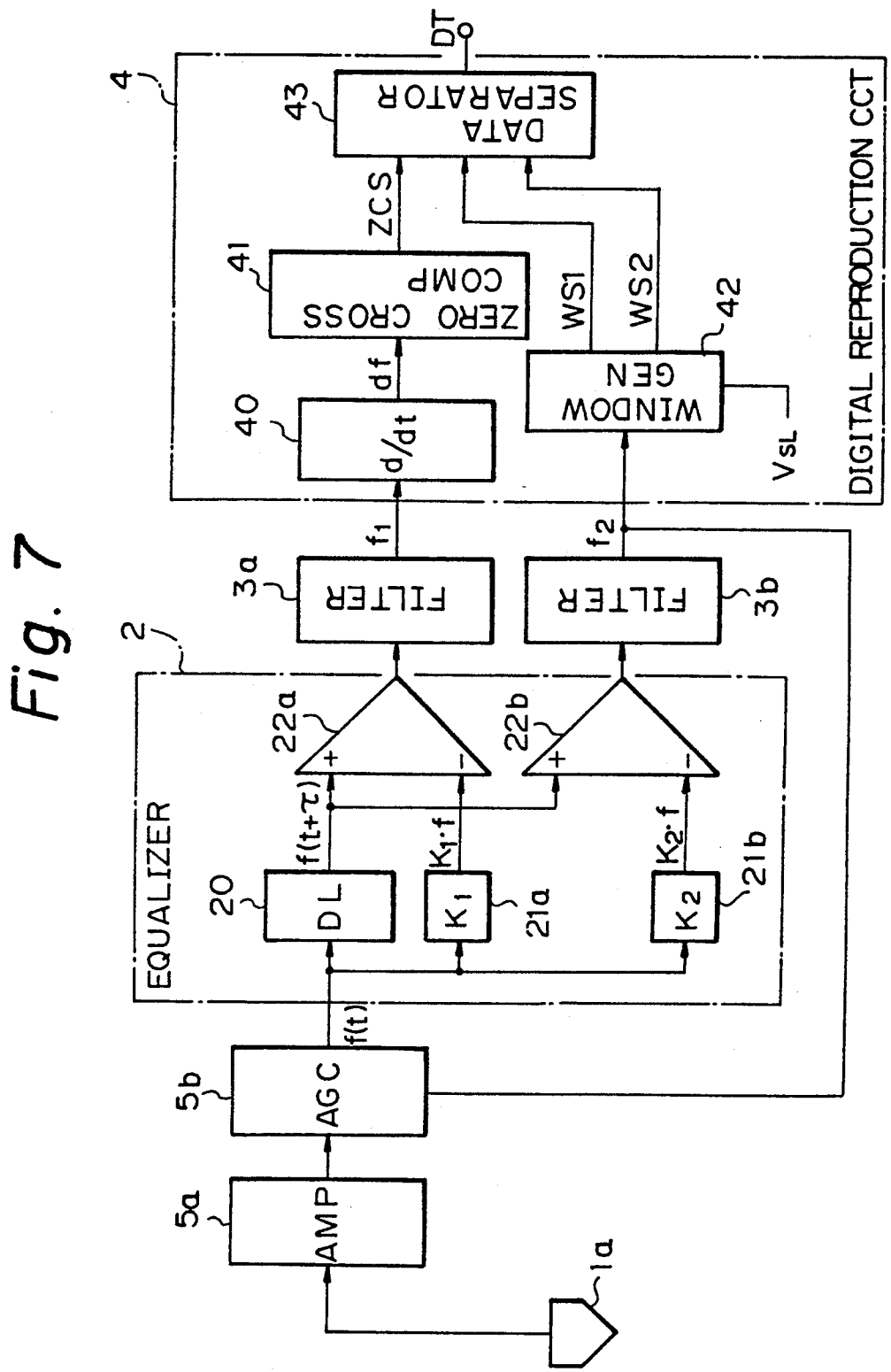
FIG. 7 is a block of an embodiment of the data reproducing circuit shown in FIG. 6, as a magnetic recording/reproducing circuit.

An embodiment of a data recording and reproducing circuit of the present invention will now be described. FIG. 7 is a diagram of the data recording and reproducing circuit used in a magnetic disk memory system, such as a magnetic recording and reproducing circuit.

In FIG. 7, the same reference numerals denote the same parts as in FIG. 6. Reference numerals 3a and 3b denote low-pass filters for cutting high frequency noise components (harmonic components) in outputs from differential amplifiers 22a and 22b 5a denotes an amplifier for amplifying a read output from a magnetic head 1a, and 5b denotes an automatic gain control (AGC) circuit for performing automatic gain control of the amplified signal.

Figure 8:
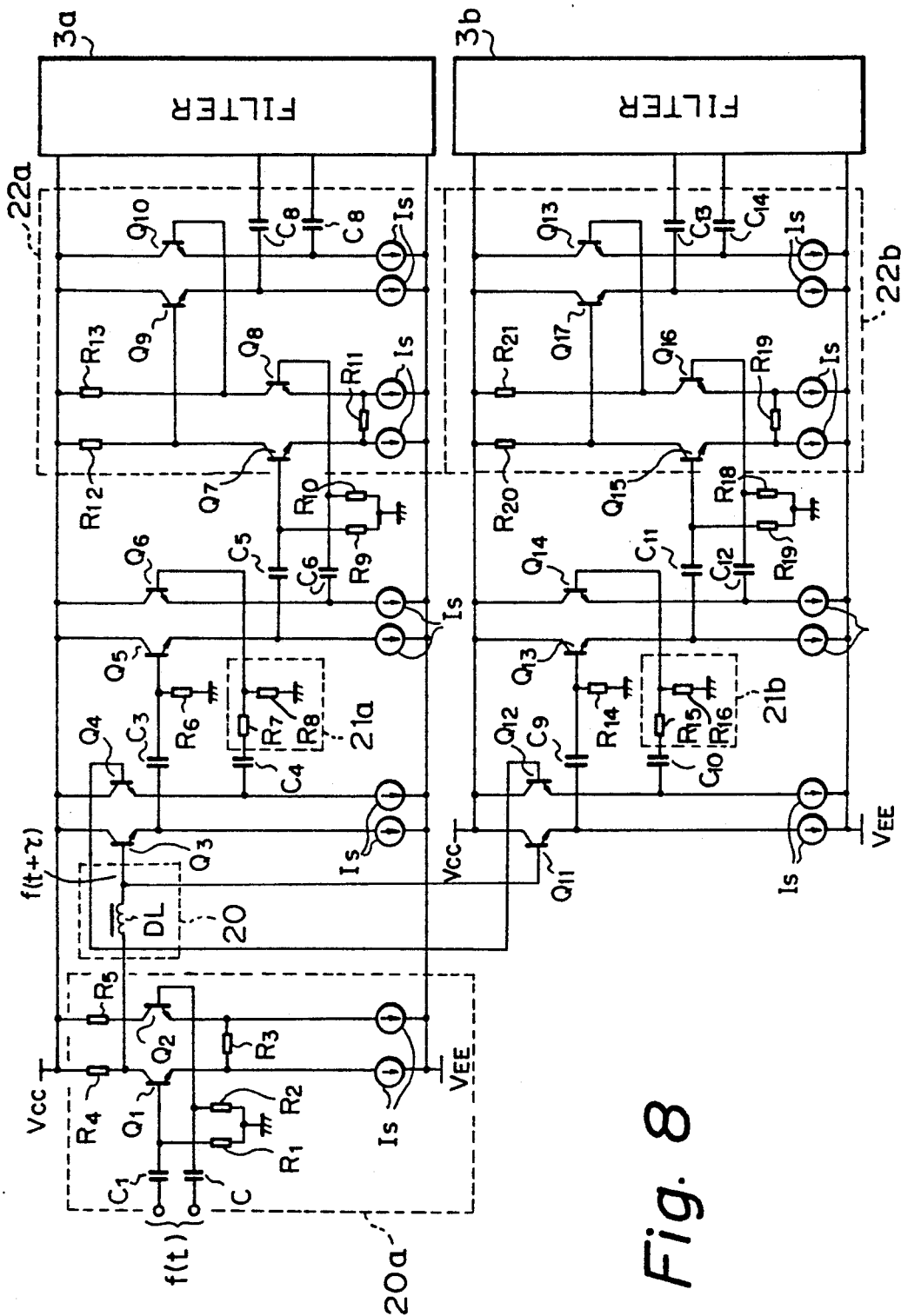

FIG. 8 is a circuit diagram of the reflection type cosine equalizer shown in FIG. 7, and FIG. 9 is a circuit diagram of the data reproducing circuit shown in FIG. 7.

In FIG. 8, reference numeral 20a denotes an input terminal circuit which receives the analog input Sf, forms an open termination of a delay circuit 20, and comprises coupling capacitors $C_1$ and $C_2$ for receiving the analog signal Sf, a pair of emitter-follower transistors $Q_1$ and $Q_2$ forming a differential amplifier, a coupling resistor $R_3$, collector resistors $R_4$ and $R_5$, and current sources Is. The collector resistors $R_4$ and $R_5$ serve as terminal resistors. Reference symbol DL denotes a delay line consisting of an inductor and delaying the collector output from the transistor $Q_1$ by a delaying time $\tau$. The output of the delay line DL is connected to a pair of emitter-follower transistors $Q_3$ and $Q_4$ to increase an input impedance of the amplifier 22a and cause a reflection. An output $f(t+\tau)$ from the delay line DL is applied to the differential amplifier 22a through a transistor $Q_3$, a coupling capacitor $C_3$, a pull-down resistor $R_6$, a transistor $Q_5$, a coupling capacitor $C_5$, and a pull-down resistor $R_9$. An input to the delay line DL is also input to the first gain adjustment circuit 21a including voltage-dividing resistors $R_7$ and $R_8$ which define the gain $k_1$ through the transistor $Q_4$ and the coupling capacitor $C_4$, and is then applied to the differential amplifier 22a through a transistor $Q_6$, a coupling capacitor $C_6$, and a pull-down resistor $R_{10}$. The differential amplifier 22a has a pair of differential transistors $Q_7$ and $Q_8$, a coupling resistor $R_{11}$, collector resistor $R_{12}$ and $R_{13}$, a pair of transistors $Q_9$ and $Q_{10}$ for outputting the collector output as the emitter output, and coupling capacitors $C_7$ and $C_8$ connected to the filter 3a.

Similarly, the output $f(t+\tau)$ of the delay line DL is input to a transistor $Q_{11}$ to increase an input impedance of the amplifier 22b to cause a reflection, and is added to the differential amplifier 22b through a coupling capacitor $C_9$, a pull-down resistor $R_{14}$, a transistor $Q_{13}$, a coupling capacitor $C_{11}$, and a pull-down resistor $R_{17}$. The input to the delay line DL is also added to the second gain adjustment circuit 21b including voltage-dividing resistors $R_{15}$ and $R_{16}$ which define the gain $k_2$ through a transistor $Q_{12}$ and a coupling capacitor $C_{11}$, and is then added to the differential amplifier 22b through a transistor $Q_{14}$, a coupling capacitor $C_{12}$, and a pull-down resistor $R_{19}$. The differential amplifier 22b includes a pair of differential transistors $Q_{15}$ and $Q_{16}$, a coupling resistor $R_{19}$, collector resistors $R_{20}$ and $R_{21}$, a pair of transistors $Q_{17}$ and $Q_{18}$ for outputting the collector output as the emitter output, and coupling capacitors $C_{13}$ and $C_{14}$. The emitters of the emitter-follower transistors $Q_1$ to $Q_{18}$ are coupled to current sources Is, respectively.

In FIG. 9, the differentiator 40 includes coupling capacitors $C_{101}$ and $C_{102}$ connected to the filter 3a, a differential amplifier including transistors $Q_{111}$, $Q_{112}$ and $Q_{113}$, a differential circuit including a capacitor $C_{105}$ and a resistor $R_{105}$, and output transistors $Q_{116}$ and $Q_{117}$. Transistor $Q_{101}$, $Q_{102}$, $Q_{104}$, $Q_{105}$, $Q_{107}$, $Q_{108}$, $Q_{118}$, $Q_{119}$, $Q_{120}$, each having an emitter of connected to a respective base, function as diodes and level shifters. A plurality of series-connected circuits of transistors and resistors, for example, a transistor $Q_{124}$ and a resistor $R_{144}$, are current sources. The zero-cross comparator 41 includes coupling capacitors $C_{103}$ and $C_{104}$, a pair of voltage divider circuits, which include of series-connected resistors $R_{116}$ and $R_{118}$, and $R_{117}$ and $R_{119}$, respectively, and three differential amplifiers. A differential amplifier first includes a pair of differential operation transistors $Q_{133}$ and $Q_{134}$ and a pair of output transistors $Q_{135}$ and $Q_{136}$. A second differential amplifier includes a pair of differential operation transistors $Q_{137}$ and $Q_{138}$ and a pair of output transistors $Q_{139}$ and $Q_{140}$. A third differential amplifier includes a pair of differential operation transistor $Q_{141}$ and $Q_{142}$ and a pair of output transistors $Q_{143}$ and $Q_{144}$. The window generating circuit 42 includes coupling capacitors $C_{106}$ and $C_{107}$, voltage dividing circuits which include series connected resistors $R_{139}$ and $R_{141}$, and $R_{140}$ and $R_{142}$, comparators CMP1 and CMP2 which operate in reverse with respect to, each other and generate the window signals WSI and WS2, and a set-reset type flip-flop FF1 outputting a third window signal WS3. The data separation circuit 43 includes a delay type flip-flop FF2, and a pulse generation circuit 431.

Figure 10:
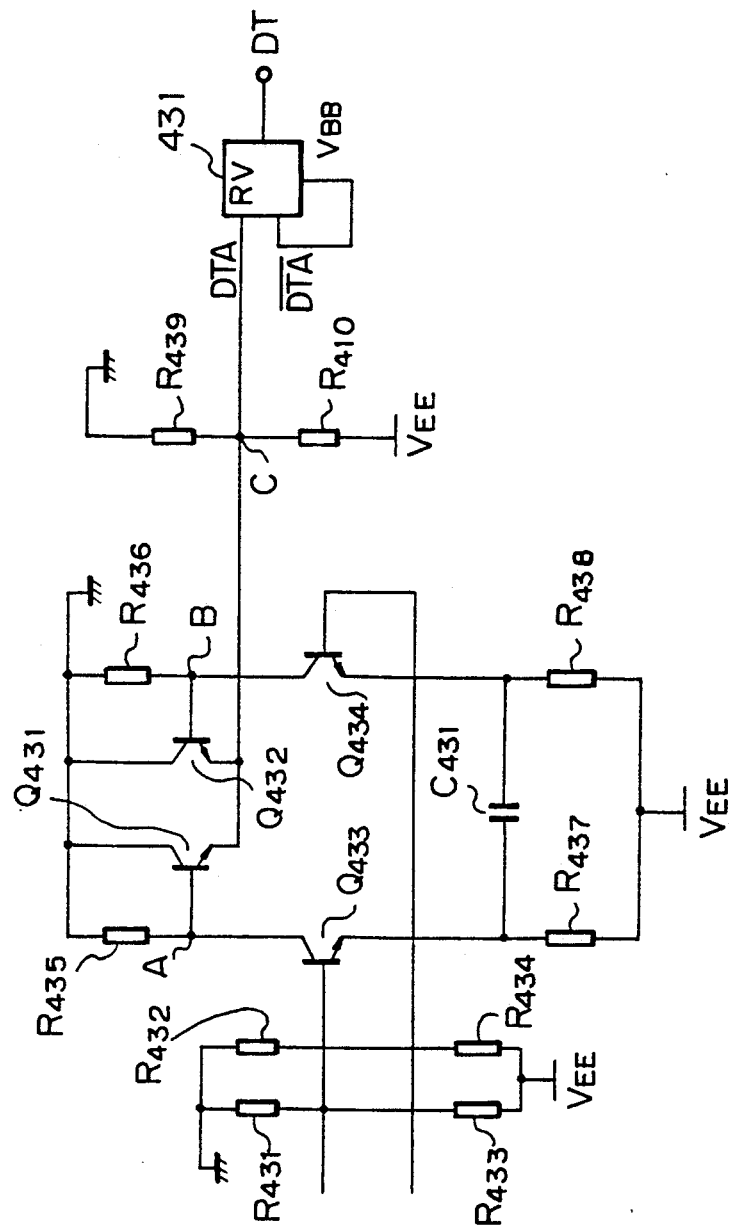
FIG. 10 is a circuit diagram of a pulse generation circuit, shown in FIG. 9.

FIG. 10 is a circuit diagram of a pulse generation circuit 431. The pulse generation circuit 431 receives a pair of outputs DTA and DTA and generates the pulsed reproduction signal DT.

Figure 11:
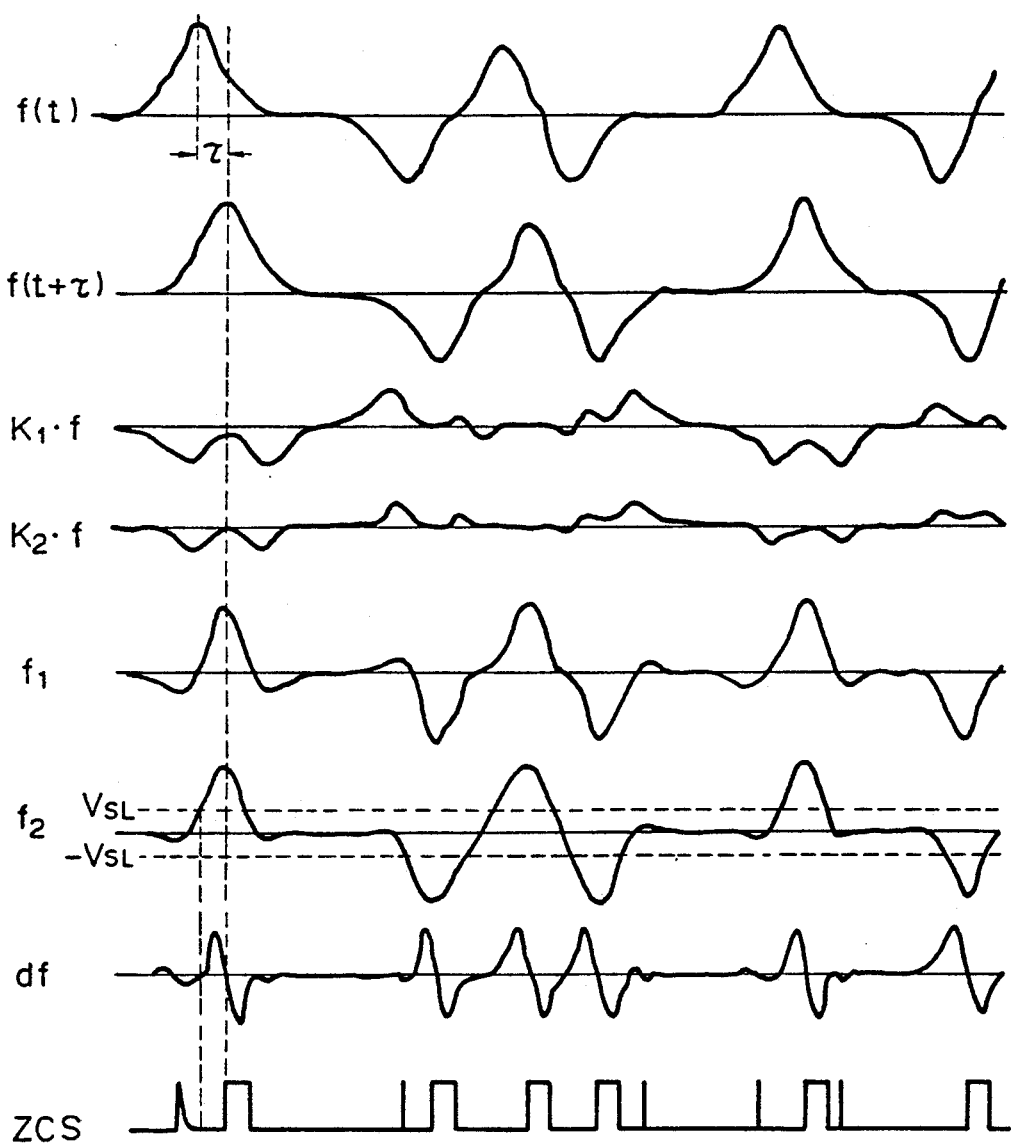
FIGS. 11 and 12 are waveform diagrams of the waveforms in the circuits shown in FIGS. 7 to 10.
Figure 12:
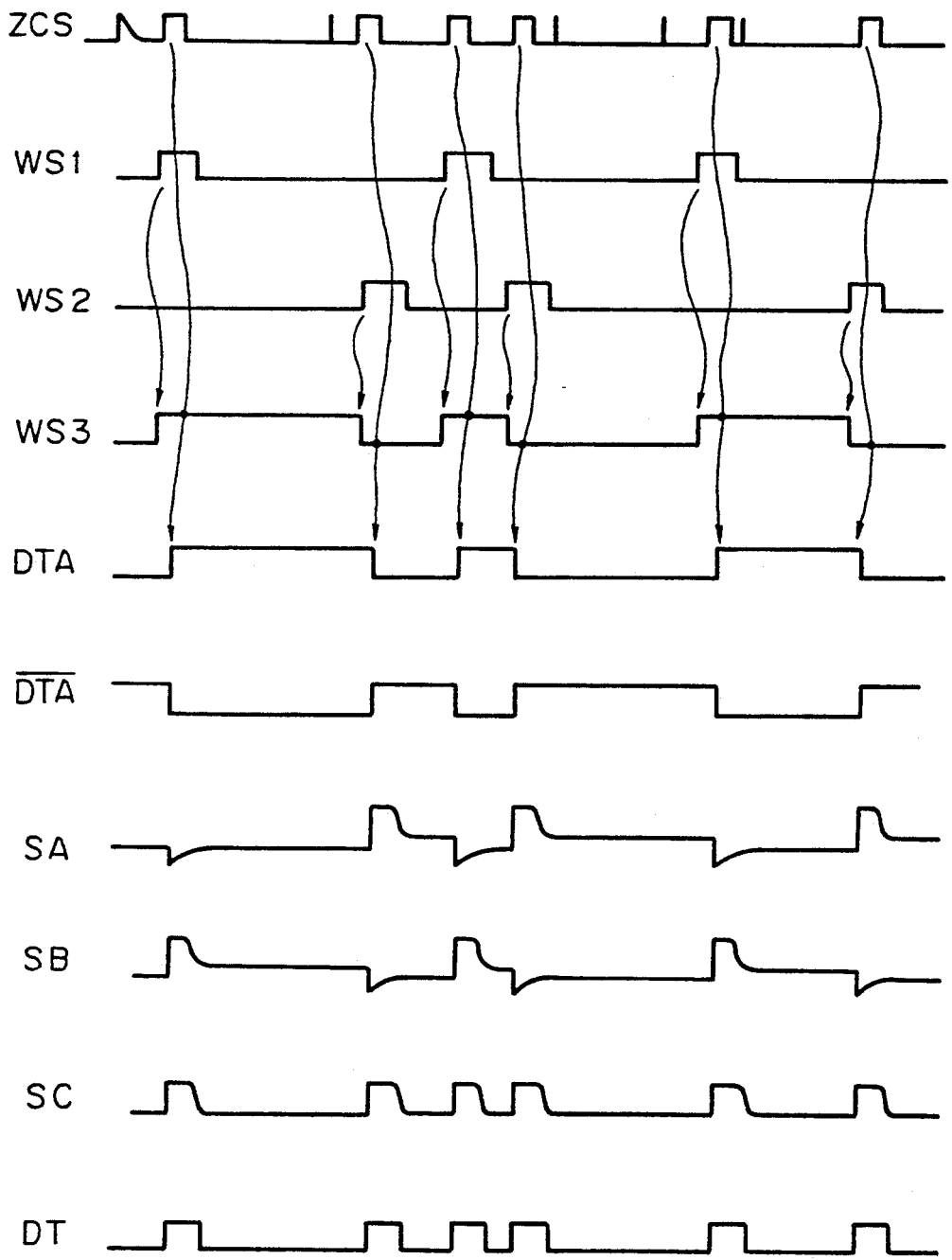

FIGS. 11 and 12 are waveforms for the circuits shown in FIGS. 7, 8, 9, and 10.

The output signal from the magnetic head 19 is amplified by the amplifier 5a, subjected to AGC control by the AGC circuit 5b, and applied to the reflection type cosine equalizer 2. The analog input f(t) is delayed by the delay time at the delay circuit 20 to obtain the delay signal $f(f+\tau)$. The first gain adjustment circuit 21a outputs the first gain adjusted signal $k_1 \cdot f$ having a large gain $k_1$, and the second gain adjustment circuit 21b outputs the second gain adjusted signal $k_2 \cdot f$ having a small gain $k_2$. The amplitude of the first gain adjusted signal $k_1 \cdot f$ is higher than that of the second gain adjusted signal $k_2 \cdot f$. The differential amplifiers 22a and 22b output differences between the delay signal $f(t+\tau)$ and the gain adjusted signals $k_1 \cdot f$ and $k_2 \cdot f$ as the equalized signals $f_1$ and $f_2$. Since the first equalized signal $f_1$ has a larger equalizing value than that of the second equalized signal $f_2$, it has a sharp waveform and shoulder portions, whereby the equalized signal, $f_1$ is differentiated by the differentiator 40 to obtain the differentiated signal df. The differentiated signal is zero-cross detected by the zero-cross comparator 41, thus obtaining a zero-cross signal ZCS. In this case, since the equalized signal $f_1$ has a sharp waveform, the S/N ratio of the differentiated output is improved, and a good zero-cross output can be obtained.

The equalized signal $f_2$ is sliced at fixed slice levels $V_{SL}$ and $-V_{SL}$ by the window generating circuit 42, thus outputting two window signals WS1 and WS2. In this case, since the equalizing value of the equalized signal $f_2$ is small, almost no shoulder portions appear. If a signal due to a medium defect is superposed on this portion, the resultant level does not exceed the slice level, and thus a good window signal can be generated.

The zero-cross signal ZCS and the window signals WS1 and WS2 are supplied to the data separator circuit 43 and defects of the in-phase components are removed. Thus a reproduction signal DT is obtained In this manner, since equalized signals $f_1$ and $f_2$ having optimal equalizing values suitable for differentiation, and windows are generated, the S/N ratio of the differentiation can be improved. Therefore, an effective reproduction can be performed even if a medium defect occurs.

In the above embodiment, the two window signals WS1 and WS2 are generated, but the equalized signal $f_2$ is full-wave rectified and is sliced at one slice level $V_{SL}$ to form one window signal for data separation.

In FIG. 12, signals SA to SC show waveforms at nodes A, B and C in the pulse generation circuit shown in FIG. 10. Also, the gain $k_2$ can be set greater than the gain $k_1$.

The digital data reproducing circuit 4 may be arranged such that the differentiator is operated by the window signal. The equalized signal $f_1$ is differentiated and input to the zero-cross comparator 41 only during a window period to reproduce data.

As described above, according to the present invention, since two equalized signals having different equalizing values are generated and used for differentiation and window generation, respectively, a differentiation with a high S/N ratio can be obtained and a window signal free from an influence of medium defects can be generated. Thus, a reproduction free from an erroneous operation caused by medium defects can be realized.

Figure 13:
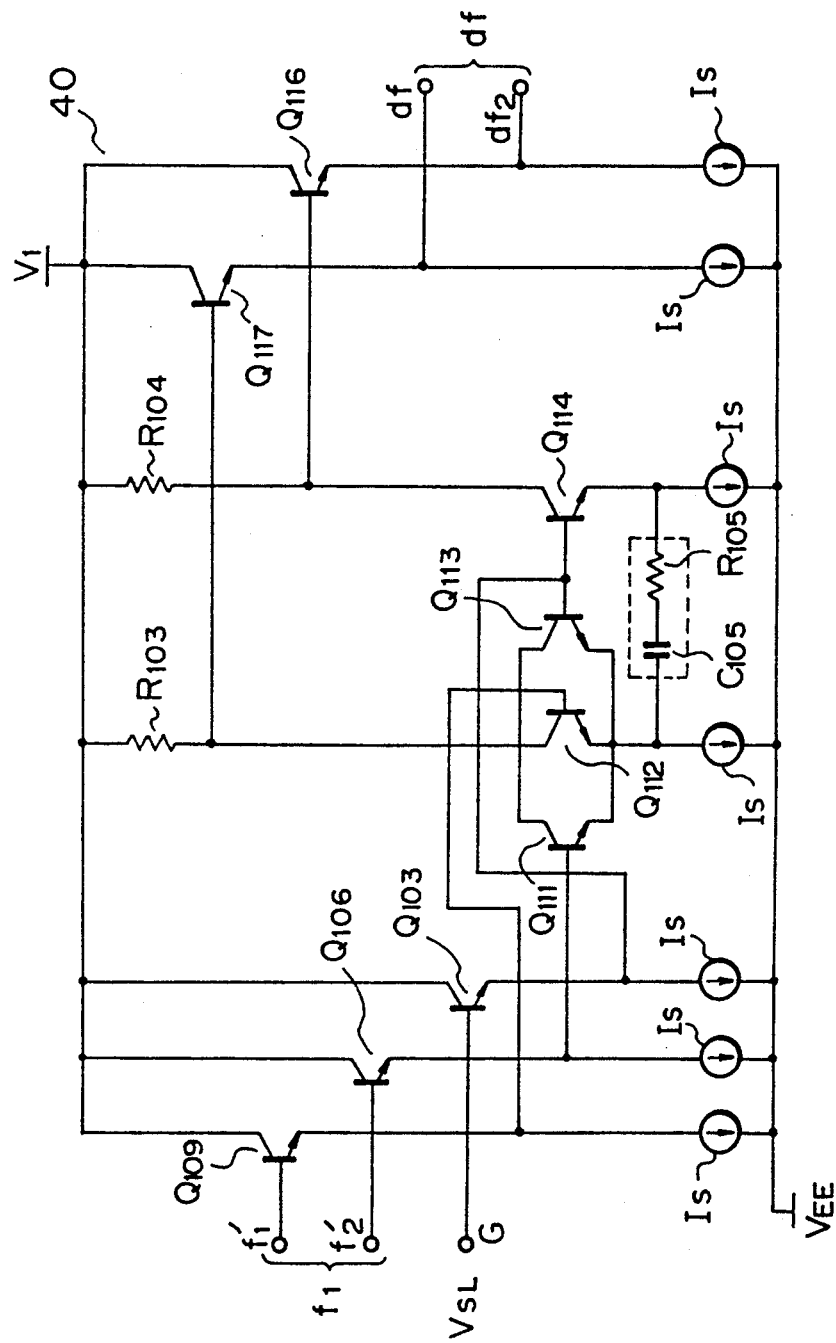
FIG. 13 is a circuit diagram of a differentiator shown in FIG. 9.

In addition, an improved differentiator for differentiating an analog data exceeding a predetermined slice level will be described FIG. 13 is a simplified circuit diagram of the differentiator 40 shown in FIG. 9. Note, this differentiator 40 is a rectification active type differentiator.

Figure 14:
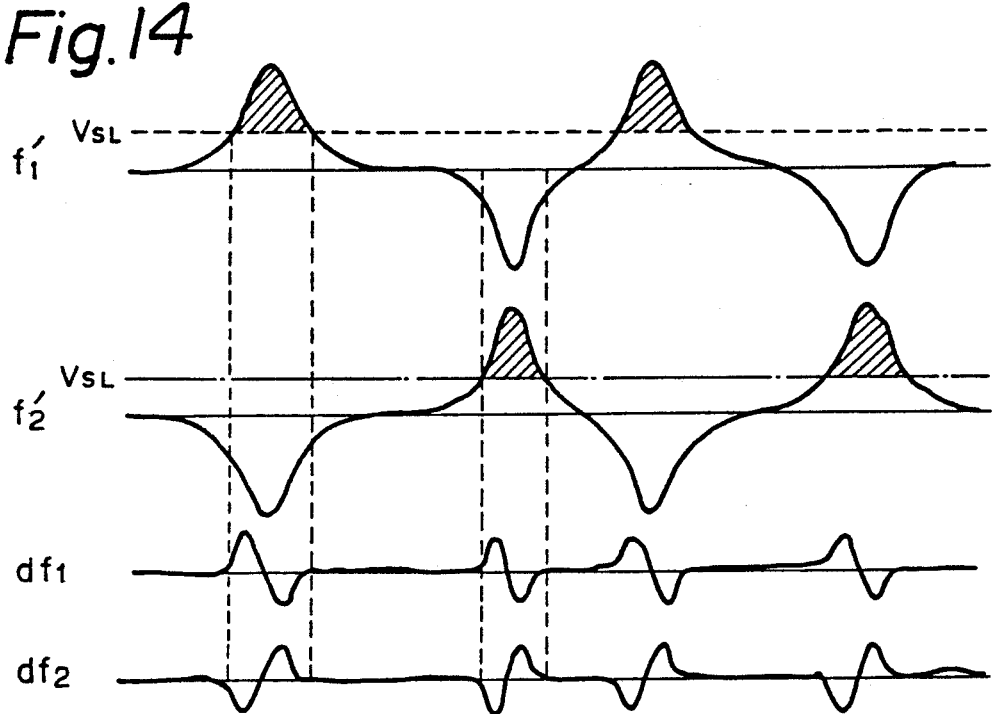
FIGS. 14 and 15 are waveform diagrams of waveforms in the differentiator shown in FIG. 13.

FIG. 14 is a waveform diagram of the differentiator 40 shown in FIG. 13.

When the differential analog signal $f'_1$ or $f'_2$ exceeds the slice voltage $V_{SL}$, a current corresponding to a difference between the transistors $Q_{112}$ and $Q_{114}$, or $Q_{111}$ and $Q_{114}$ flows in the capacitor $C_{105}$ and through the resistor $R_{105}$ of the differentiating circuit, to achieve a differentiation. Therefore, the differentiation cannot be made for a noise component below the slice voltage $V_{SL}$. Thus, a noise component can be removed, and a differentiation can be made for only a regular signal.

Figure 15:
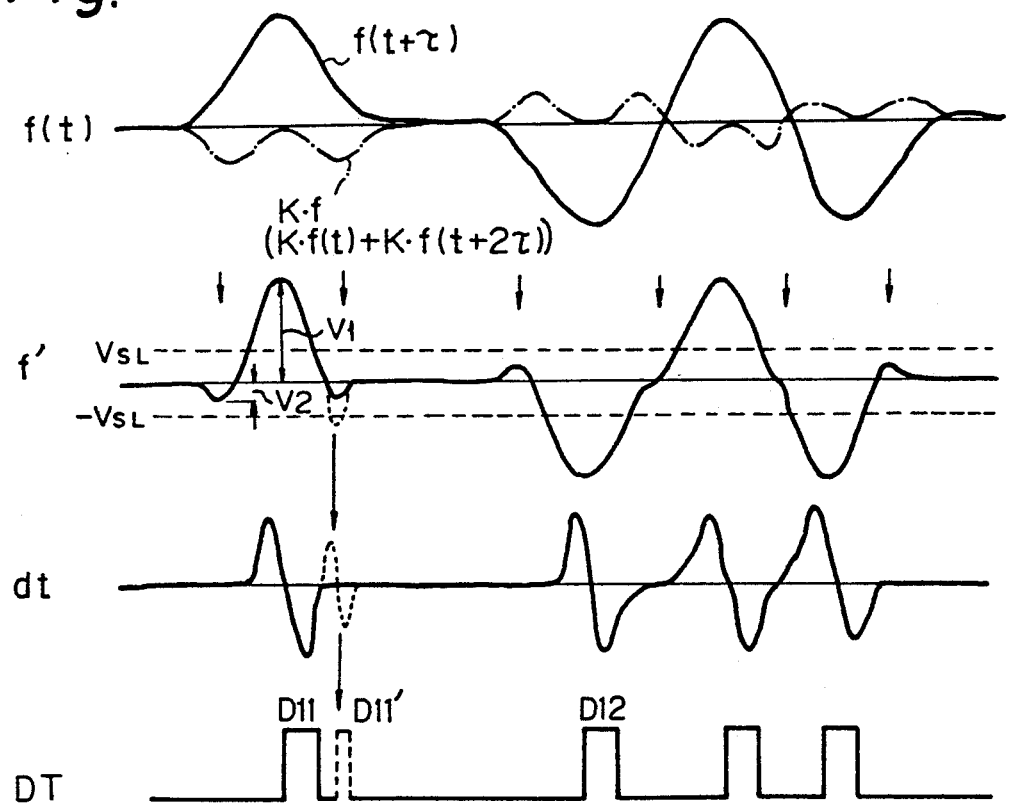

When such a differentiator 40 is used for the magnetic reproducing circuit, some problems may arise as shown in FIG. 15.

The input signal f(t) from the magnetic head 1a is input to the reflection type cosine equalizer 2 and is delayed by the delay time $\tau$ at the delay element 20. The delayed output $f(t+\tau)$ is supplied to the differential amplifier 22a. The gain adjustment circuit 21a connected in parallel to the delay element 20 outputs the gain adjusted signal $k_1 \cdot f(t) + k_1 \cdot f(t+2\tau)$. The equalized signal f1 can be obtained by the differential operation of the differential amplifier 22a. The equalized signal f1 is supplied to the differentiator 40 through the filter 3a, and is differentiated as described above. The differentiated signal is then zero-cross detected by the zero-cross comparator 41, and a reproduced signal DT is obtained.

Nevertheless, since the differentiator 40 directly slices the input analog signal f1 with the slice voltage $V_{SL}$, only a difference between the analog signal $f_1$ and the slice voltage $V_{SL}$ is differentiated and the differentiated signal has a small level. This results in a small differentiation gain, and lowers the S/N ratio.

In the magnetic reproducing circuit, to increase the S/N ratio of the differentiator 40, shoulder portions appear in both side portions of an original waveform, as indicated by arrows in FIG. 15. As the equalizing value is increased, the voltage $V_1$ is decreased, and the voltage $V_2$ is increased.

If a signal caused by defects on a disk medium is superposed on this shoulder portion, the level may exceed the fixed slice level $V_{SL}$, as indicated by dotted curves in FIG. 15. In this case, erroneous data D11' caused by the shoulder portion is reproduced in addition to data D11, as indicated by dotted curves in FIG. 15.

For this reason, an increase in the S/N ratio of the differentiator 40 and removal of an erroneous reproduction signal due to medium defects are conflicting requirements.

Figure 16:
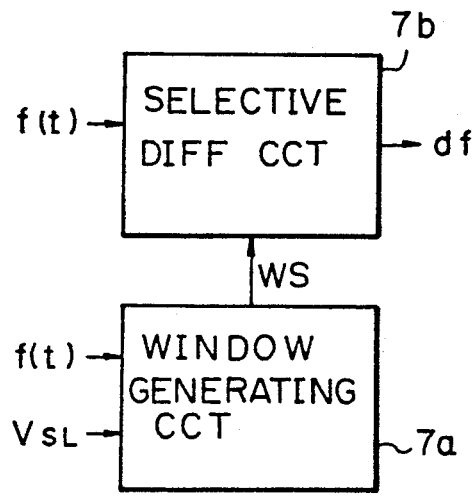
FIG. 16 is a block diagram of a differentiator in accordance with the present invention.

FIG. 16 is a block circuit diagram of a differentiator 5 in accordance with the present invention.

In FIG. 16, the differentiator of the present invention has a window generating circuit 7a for slicing the analog signal f(t) at a predetermined slice level $V_{SL}$ to generate a window signal WS, and a selective differentiating circuit 7b for receiving the analog signal f(t) and differentiating the analog signal exceeding a signal level input to the gate terminal thereof. The window signal WS is supplied to the gate terminal of the selective differentiating circuit 7b.

Figure 17:
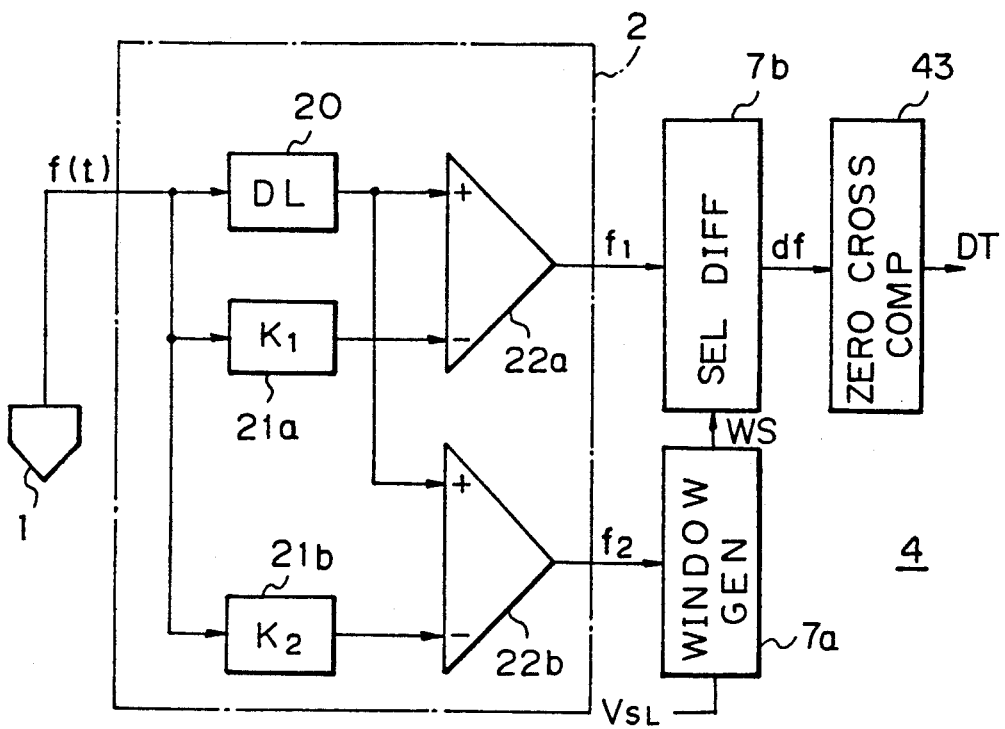
FIG. 17 is a block of a second data reproducing circuit using the differentiator shown in FIG. 16, in accordance with the present invention.

As shown in FIG. 17, a data reproducing circuit of the present invention has the reflection type cosine equalizer 2 having the same circuit construction as that shown in FIG. 6, for outputting the pair of equalized signals f1 and f2, and the window generating circuit 7a for slicing f2 of the pair of equalized signals at the predetermined slice level $V_{SL}$ to generate a window signal WS, the selective differentiating circuit 7b for receiving f1 of the pair of equalized signals and equalizing the equalized signal f1 exceeding the window signal WS input to the gate terminal. In addition, it has the zero-cross comparator 43 for obtaining a digital reproduction signal DT from the output from the selective differentiating circuit 5b. A digital data reproducing circuit 4a includes of the selective differentiating circuit 5b, the window generating circuit 5a, and the zero-cross comparator 43.

Figure 18:
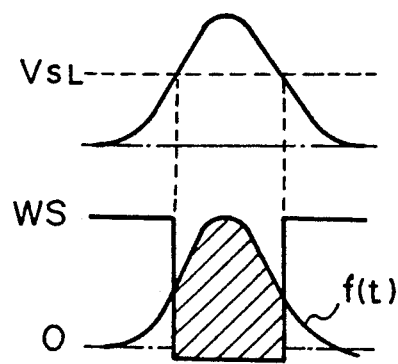
FIG. 18 is a waveform diagram of the waveforms in the differentiator shown in FIG. 16.

As shown in FIG. 18, in the differentiator 7 of the present invention, the input analog signal f(t) and the slice level $V_{SL}$ are compared to generate the window signal WS. The window signal WS is added to the selective differentiating circuit 7b as a level signal. The window signal WS is low level when the analog signal f(t) exceeds the slice level $V_{SL}$, and is high level when the signal f(t) does not exceed the slice level. The level itself of the analog signal f(t) can be differentiated, and a differentiation gain can be increased.

In the data reproducing circuit of the present invention, the reflection type cosine equalizer 2 generates the two equalized signals $f_1$ and $f_2$ having different gains $k_1$ and $k_2$. The digital data reproducing circuit 4 can use the equalized signals $f_1$ and $f_2$ having the different equalizing gains $k_1$ and $k_2$ for differentiation and window generation, respectively. For this reason, a differentiation with a high S/N ratio can be made by the differentiator 57 supplied with the equalized signal $f_1$ having the large equalizing value, and a window can be generated using the equalized signal $f_2$ having the small equalizing value. Therefore, a window with defects is not generated, and an erroneous reproduction signal due to medium defects is stably removed.

Figure 19:
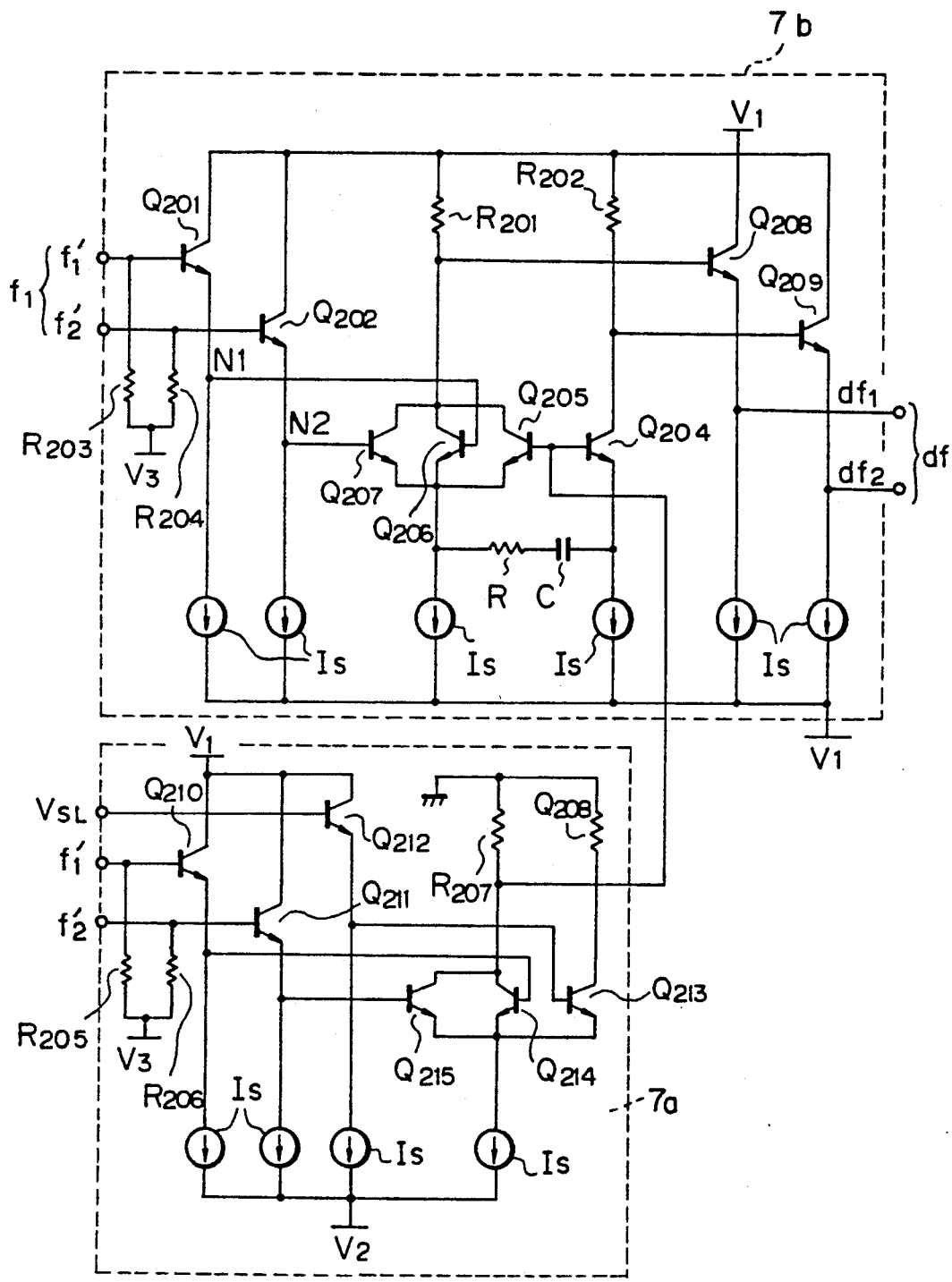
FIG. 19 is a circuit diagram of the differentiator shown in FIGS. 16 and 17.

FIG. 19 is a circuit diagram of a circuit of the differentiator 7 according to an embodiment of the present invention.

The window generating circuit 7a has input resistor $R_{205}$ and $R_{206}$ and input transistor $Q_{210}$ and $Q_{211}$ for receiving the analog signals $f_1$ and $f_2$, an input transistor $Q_{112}$ for receiving the slice voltage $V_{SL}$, and a rectification differential amplifier consisting of transistor $Q_{213}$, $Q_{214}$, and $Q_{215}$. Reference symbols $R_{207}$ and $R_{208}$ denote collector resistors and Is denotes current sources.

A selective differentiating circuit 7b is similar to the differentiating circuit shown in FIG. 11 except that different reference numerals are used. The circuit 7b is a rectification active type differentiating circuit in which the window signal WS is input to the gate terminal thereof, instead of the slice voltage $V_{SL}$.

Figure 20:
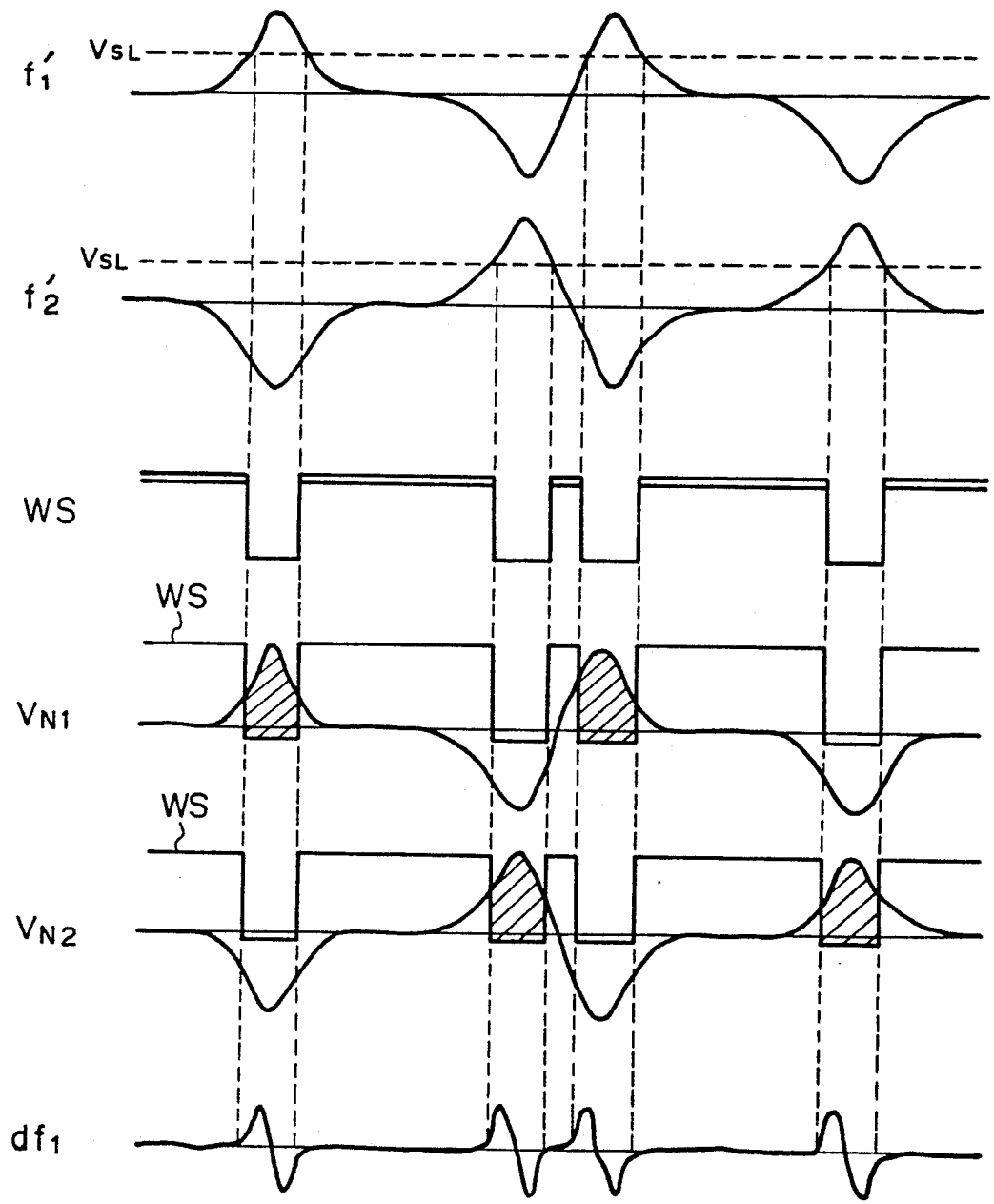
FIG. 20 is a waveform diagram of the waveforms in the differentiator shown in FIG. 19.

FIG. 20 is a waveform diagram for explaining an operation of the differentiation 7 shown in FIG. 19.

In the window generating circuit 7a, one analog input signal $f'_1$ is supplied to the base of the transistor $Q_{214}$ through the transistor $Q_{210}$. The other analog input signal $f'_2$ is supplied to a base of the transistor $Q_{215}$ through the transistor $Q_{211}$. Since a base of the transistor $Q_{213}$ receives the slice voltage $V_{SL}$ through the transistor $Q_{212}$, a rectification difference is obtained, and thus, when $f'_1 \geq V_{SL}$, or $f'_2 \geq V_{SL}$, the window signal WS is set at a low level. In another case, the window signal WS is set at a high level. In the selective differentiating circuit 7b, the analog signal $f'_1$ is supplied to a base of the transistor $Q_{206}$ through the transistor $Q_{201}$, and the analog signal $f'_2$ is supplied to a base of the transistor $Q_{207}$ through the transistor $Q_{202}$. Since bases of the transistors $Q_{204}$ and $Q_{205}$ receive the window signal WS, a current corresponding to a difference between the analog signals $f'_1$ and $f'_2$ and the low-level window signal WS flows through the differentiation resistor R and the capacitor C due to the rectification difference. In FIG. 20, references $V_{N1}$ and $V_{N2}$ denote voltages at nodes N1 and N2.

Therefore, a differentiation occurs at hatched portions in FIG. 20, and the differentiated signal is output through the output transistors $Q_{208}$ and $Q_{209}$. Accordingly, the differentiation gain can be increased, and the S/N ratio of a signal can be raised.

Figure 21:
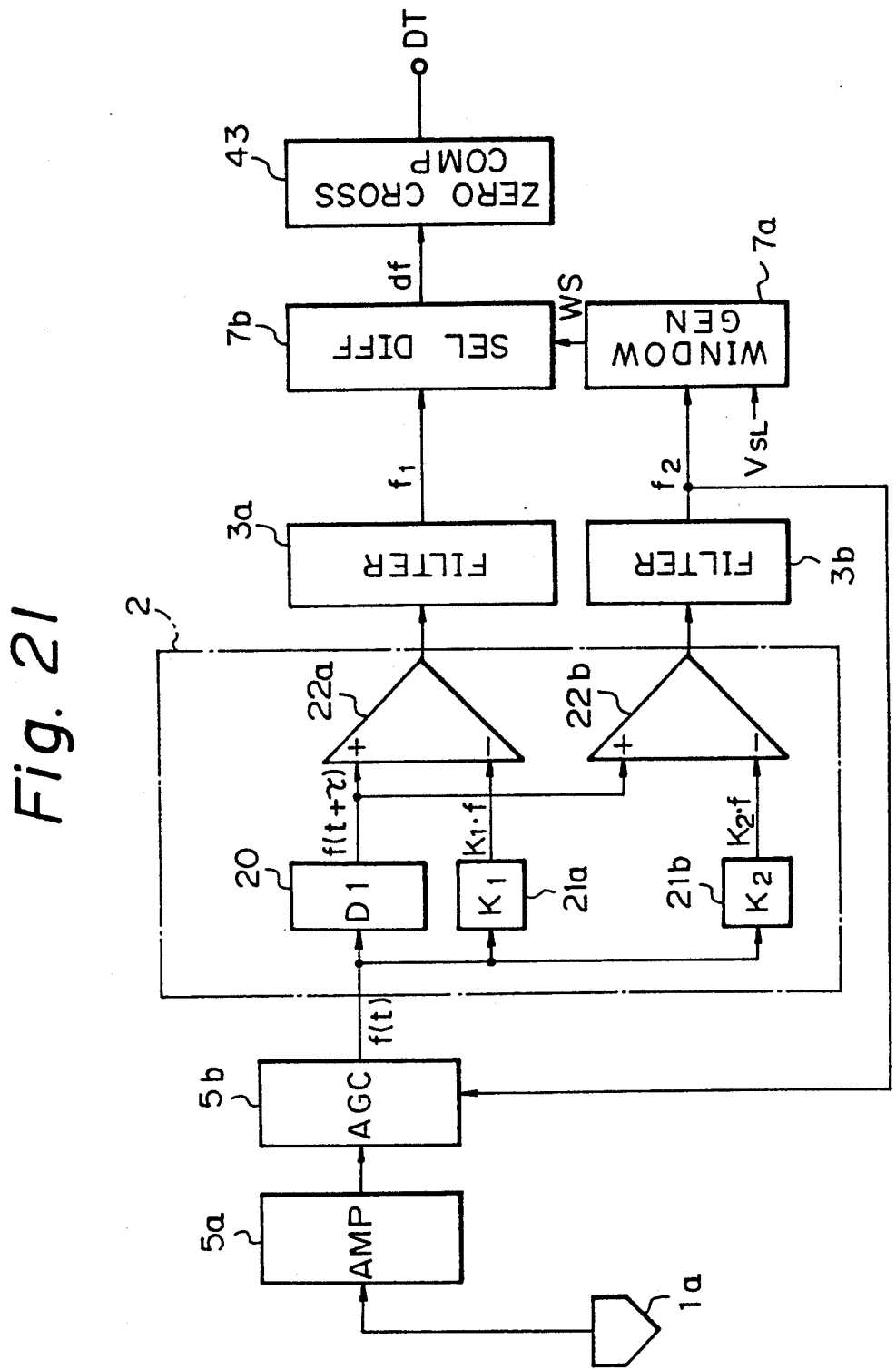
FIG. 21 is a block of another embodiment of a magnetic reproducing circuit according to the present invention.
Figure 22:
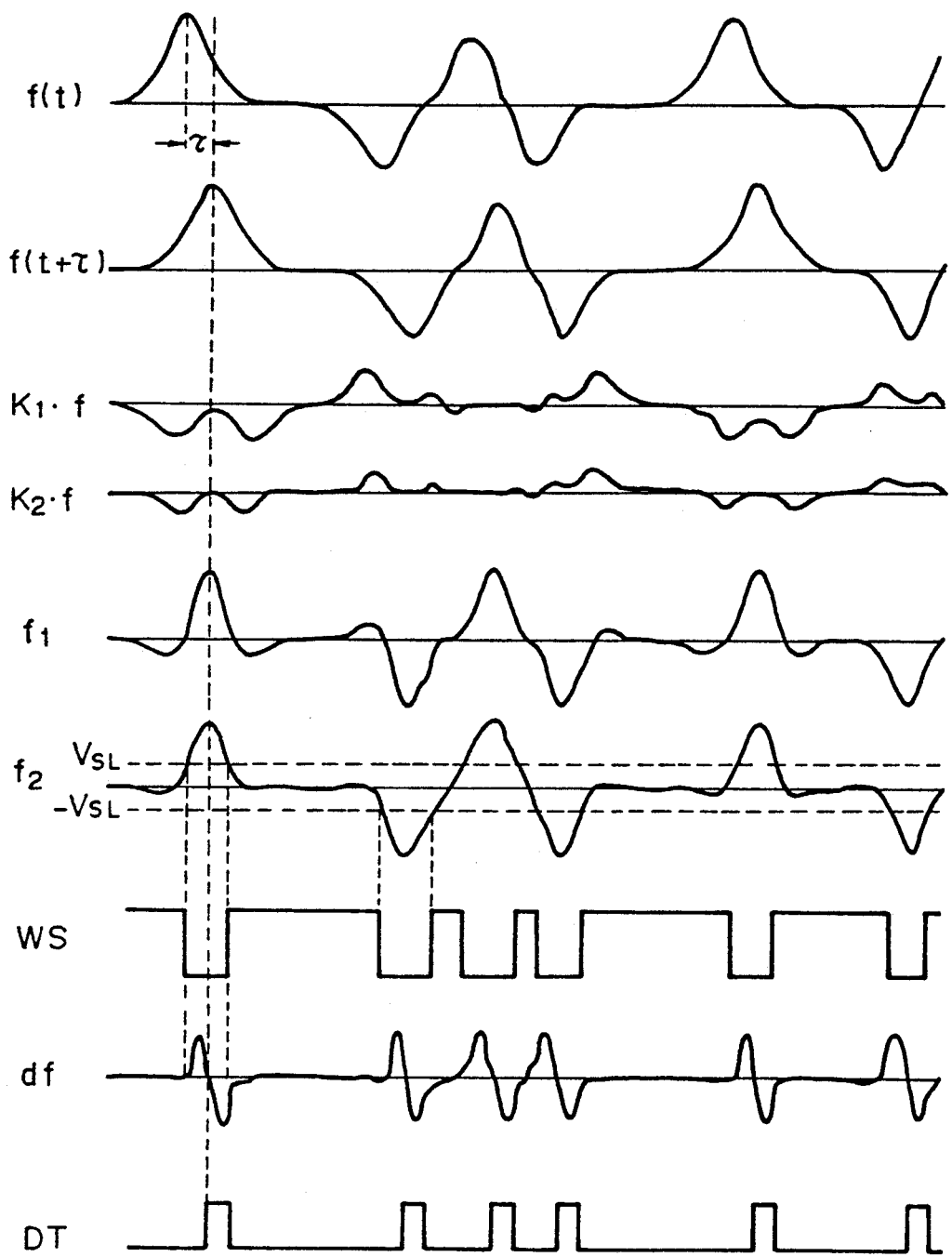
FIG. 22 is a waveform diagram of the waveforms in the magnetic reproducing circuit shown in FIG. 21.

FIG. 21 is a block showing an arrangement of a magnetic reproducing circuit according to the embodiment of the present invention. FIG. 22 is a waveform diagram of the embodiment of the present invention. The operation of the arrangement shown in FIG. 21 will be described below with reference to FIG. 22.

The output from the magnetic head 1a is amplified by the amplifier 5a, is AGC-controlled by the AGC circuit 5b, and is then supplied to the reflection type cosine equalizer 2. The analog input is delayed by the delay time $\tau$ at the delay circuit 20 to be converted to a delay signal $f(t+\tau)$. The first gain adjustment circuit 21a outputs the first- gain adjusted signal $k_1 \cdot f$ having the large gain $k_1$. The second gain adjustment circuit 21b outputs the second gain adjusted signal $k_2 \cdot f$ with the small gain $k_2$. The amplitude of the first gain adjusted signal $k_1 \cdot f$ is higher than that of the second gain adjusted signal $k_2 \cdot f$. The differential amplifiers 22a and 22b output differences between the delay signal $f(f+\tau)$ and the gain adjusted signals $k_1 \cdot f$ and $k_2 \cdot f$ as equalized signals $f_1$ and $f_2$. Since the equalized signal $f_1$ has a larger equalizing value than that of the equalized signal $f_2$, the waveform thereof is sharp and has shoulder portions.

The equalized signal $f_2$ is rectified and compared with the slice voltage $V_{SL}$ by the window signal generating circuit 7a, thus generating the window signal WS. In this case, since the equalizing value of the equalized signal $f_2$ is small, almost no shoulder portions appear. If a signal caused by medium defects is superposed on this portion, the level thereof does not exceed the slice level, and thus a good window signal can be generated. The equalized signal $f_1$ is supplied to the selective differentiating circuit 7b, and is differentiated while gating the window signal WS.

The differentiated signal df is zero-cross detected by the zero-cross comparator 43, to thus obtain the reproduction signal DT. In this case, since the equalized signal $f_1$ has a sharp waveform, the S/N ratio of the differentiated output is raised, and a good zero-cross output can be obtained. Also, since the differentiation gain is large, a good differentiated output can be obtained.

In this manner, since equalized signals having optimized equalizing values are generated for differentiation and window generation, respectively, the S/N ratio of differentiation can be raised, and an effective reproduction free from medium defects can be obtained.

In the above embodiment, the rectification differentiating circuit 7b is used, but if a full-wave rectifier circuit is arranged at an input side, the differentiating circuit does not need a rectification function. Similarly, if a full-wave rectifier circuit is arranged at an input side of the window generating circuit, a rectification function is not needed.

The application of the differentiator is not limited to the magnetic reproducing circuit. For example, the differentiator can be applied to other circuits if a noise component below a predetermined level is to be removed.

As described above, according to the differentiator of the present invention, the differentiation gain of the selective differentiating circuit can be increased, and a good differentiated output can be obtained.

According to the magnetic reproducing circuit of the present invention employing the differentiator therein, since two equalized signals having different equalizing values are generated and used for differentiation and window generation, respectively, differentiation with a large gain and a high S/N ratio can be achieved. In addition, a window signal free from the influence of signal defects can be generated, and thus reproduction free from erroneous operations caused by medium defects can be realized.

Although the preferred embodiments according to the present invention are described in the foregoing, the present invention can be embodied in a variety of forms within the scope and spirit of the present invention.

I claim:

1. A data reproducing circuit for a memory system having a data sensing head, comprising:

an equalizer, operatively connected to receive an analog signal from the data sensing head, varying an amplitude of said analog signal in accordance with a predetermined time, and generating first and second equalized signals from said analog signal, said equalizer including a delay circuit, first and second gain circuits and first and second differential amplifier circuits, said delay circuit and said first gain circuit being connected to a separate input terminal of said first differential amplifier, and said delay circuit and said second gain circuit being connected to a separate input terminal of said second differential amplifier circuit; and a digital data reproducing circuit, operatively connected to said equalizer, for receiving said first and second equalized signals, for differentiating said first equalized signal, for generating a window signal when and during a time said second equalized signal is greater than a predetermined threshold level, and for outputting a pulsed reproduction signal when said differentiated signal is greater than a predetermined level and said window signal exists.

2. A data reproducing circuit according to claim 1, wherein said equalizer comprises:

a first equalizing signal generation circuit generating a first equalized signal f1 expressed by $$f1 = f(t+\tau) - K_1\{f(t) + f(t+2\tau)\}$$

where,
f(t) is a signal sensed by said head,
$\tau$ is a delay time, and
$k_1$ is a first equalizing gain, and a second equalizing signal generation circuit generating a second equalized signal f2 expressed by $$f2 = f(t+\tau) - k_2\{f(t) + f(t+2\tau)\}$$

where, $k_2$ is a second equalizing gain.

3. A data reproducing circuit according to claim 1, wherein said digital data reproducing circuit comprises:

a differentiator, operatively connected to said equalizer, for receiving said first equalized signal and differentiating said first equalized signal by a predetermined differential constant;

a window signal generation circuit, operatively connected to said equalizer, for receiving said second equalized signal and for generating a window signal when said second equalized signal is greater than said predetermined threshold level; and a pulse generation circuit, operatively connected to said differentiator and said window generation circuit, for generating said pulsed reproduction signal when said differential signal is greater than said predetermined level and said window signal exists.

4. A data reproducing circuit according to claim 1, wherein said digital data reproducing circuit comprises:

a window signal generation circuit for discriminating a signal from the data sensing head and having an amplitude of a predetermined threshold value, for generating a window signal when the signal from the data sensing head is greater than said predetermined threshold valve;

a selective differentiating circuit, operatively connected to said window signal generation circuit, for receiving said window signal, differentiating another signal corresponding to the signal to be discriminated and having an amplitude higher than an amplitude of the signal to be discriminated by a predetermined differentiating constant, and gating said differentiated signal by said window signal from said window signal generation circuit; and a pulse generation circuit, operatively connected to said selective differentiating circuit, for generating said pulsed reproduction signal when said gated differential signal is greater than a predetermined pulsing threshold level.

5. A data reproducing circuit for a memory system having a data sensing head, comprising:

an equalizer, operatively connected to receive an analog signal from the data sensing head, varying an amplitude of said analog signal in accordance with a predetermined time, and generating first and second equalized signals for said analog signal, said equalizer comprising:

a first equalizing signal generation circuit generating a first equalized signal $f_1$ expressed by $$f1 = f(t+\tau) - k_1\{f(t) + f(t+2\tau)\}$$

where, f(t) is a signal sensed by the data sensing head,
$\tau$ is a delay time, and
$k_1$ is a first equalizing gain, wherein said first equalizing signal generation circuit comprises:

a first delay circuit, having an input terminal and an output terminal, operatively connected to receive said sensed signal and delaying said sensed signal by said delay time;

a first gain circuit having an input terminal connected to the input terminal of said first delay circuit, having an output terminal, and having said first equalizing gain; and a first subtracting circuit having a first input terminal connected to the output terminal of said first delay circuit, and having a high input impedance, whereby the signal from said first delay circuit is reflected back to said first delay circuit, and having a second input terminal connected to the output terminal of said first gain circuit.

said first delay circuit outputting said first delay signal $f(t+\tau)$ to the first input terminal of said first subtracting circuit and said second delay signal $f(t+2\tau)$, based upon said reflection signal from the first input terminal of said first subtracting circuit, to said input terminal of said first gain circuit, said first gain circuit outputting a signal of $k_1 \cdot f(t)$ and $k_1 \cdot f(t+2\tau)$ to the second input terminal of said first subtracting circuit, and said first subtracting circuit subtracting the signal output from said first gain circuit from the signal output from said first delay circuit, to output said first equalized signal f1, and a second equalizing signal generation circuit generating a second equalized signal f2 expressed by $$f2 = f(t+\tau) - k_2\{f(t) + f(t+2\tau)\}$$

where, $k_2$ is a second equalizing gain,
wherein said second equalizing signal generation circuit comprises:

a second delay circuit having an input terminal and an output terminal, operatively connected to receive said sensed signal and delaying said sensed signal by said delay time;

a second gain circuit having an input terminal connected to the input terminal of said second delay circuit, having an output terminal, and having said second equalizing gain; and a second subtracting circuit having a first input terminal connected to the output terminal of said second delay circuit, and having a high input impedance, whereby the signal from said second delay circuit is reflected back to said second delay circuit, and having a second input terminal connected to the output terminal of said second gain circuit, said second delay circuit outputting said third delayed signal $f(t+\tau)$ to the first input terminal of said second subtracting circuit and said fourth delay signal $f(t+2\tau)$, based upon said reflection signal from the first input terminal of said second subtracting circuit, to the input terminal of said second gain circuit, said second gain circuit outputting a signal of $k_2 \cdot f(t)$ and $k_2 \cdot f(t+2\tau)$ to the second input terminal of said second subtracting circuit, and said second subtracting circuit subtracting the signal output from said second gain circuit from the signal output from said second delay circuit, to output said second equalized signal f2; and a digital data reproducing circuit, operatively connected to said equalizer, for receiving said first and second equalized signals, for differentiating said first equalized signal, for generating a window signal when and during a time said second equalized signal is greater than a predetermined threshold level, and for outputting a pulsed reproduction signal when said differentiated signal is greater than a predetermined level and said window signal exists.

6. An equalizer according to claim 5, wherein said first delay circuit comprises a first inductor, and said second delay circuit comprises a second inductor, said first and second inductors defining said delay time.

7. A differentiator for a data reproducing circuit in a memory system having a data sensing head, comprising:

a window signal generation circuit, operatively connected to the data sensing head, for discriminating a signal from the data sensing head and having an amplitude of a predetermined threshold to generate a window signal when said signal is greater than a predetermined threshold value; and a selective differentiating circuit, operatively connected to said window generation circuit, for receiving said window signal, differentiating another signal corresponding to said signal to be discriminated and having an amplitude higher than an amplitude of said window signal by a predetermined differentiating constant.

8. A data reproducing circuit for a memory system having a data sensing head, comprising:

an equalizer, operatively connected to receive an analog signal from the data sensing head, varying an amplitude of said analog signal in accordance with a predetermined time, and generating first and second equalized signals from said analog signal, said equalizer comprising:

a first equalizing signal generation circuit generating a first equalized signal f1 expressed by $$f1 = f(t+\tau) - k_1\{f(t) + f(t+2\tau)\}$$

where, f(t) is a signal sensed by the data sensing head, $\tau$ is a delay time, and $k_1$ is a first equalizing gain, said first equalizing signal generation circuit comprising:

a first delay circuit, operatively connected to said second equalizing signal generation circuit, for receiving said second equalized signal and delaying said sensed signal by said second equalized signal and having an input terminal and an output terminal;

a first gain circuit having an input terminal connected to the input terminal of said first delay circuit and having said first equalizing gain and having an output terminal; and a first subtracting circuit having a first input terminal connected to the output terminal of said first delay circuit, and having a high input impedance, whereby the signal from said first delay circuit as reflected back to said first delay circuit, and having a second input terminal connected to the output terminal of said first gain circuit, said first delay circuit outputting a first delay signal $f(t+\tau)$ to the first input terminal of said first subtracting circuit and a second delay signal $f(t+2\tau)$, based upon said reflection signal input from said first input terminal of said first subtracting circuit, to the input terminal of said first gain circuit, said first gain circuit outputting a signal of $k_1 \cdot f(t)$ and $k_1 \cdot f(t+2\tau)$ to the second input terminal of said first subtracting circuit, said first subtracting circuit subtracting the signal output from said first gain circuit from the signal output from said first delay circuit, and outputting said first equalized signal f1;

a second equalizing signal generation circuit generating a second equalized signal f2 expressed by $$f2 = f(t+\tau) - k_2\{f(t) + f(t+2\tau)\},$$

said second equalizing signal generation circuit comprising:

a second delay circuit, operatively connected to said second equalizing signal generation circuit, for receiving said second signal and delaying said sensed signal by said delay and having an input terminal and an output terminal;

a second gain circuit having an input terminal connected to the input terminal of said second delay circuit and having said second equalizing gain and having an output terminal; and a second subtracting circuit having a first input terminal connected to the output terminal of said second delay circuit, and having a high input impedance, whereby the signal from said second delay circuit is reflected back to said second delay circuit, and having a second input terminal connected to the output terminal of said second gain circuit, said second delay circuit outputting a third delayed signal $f(t+\tau)$ to the first input terminal of said second subtracting circuit and a fourth delay signal $f(t+2\tau)$, based upon said reflection signal from the first input terminal of said second subtracting circuit, to the input terminal of said second gain circuit, said second gain circuit outputting a signal of $k_2 \cdot f(t)$ and $k_2 \cdot f(t+2\tau)$ to the second input terminal of said second subtracting circuit, and said second subtracting circuit subtracting the signal output from said second gain circuit from the signal output from said second delay circuit, and outputting said second equalized signal f2;

a digital data reproducing circuit, operatively connected to said equalizer, for receiving said first and second equalized signals, for differentiating said first equalized signal, for generating a window signal when and during a time said second equalized signal is greater than a predetermined threshold level, and for outputting a pulsed reproduction signal when said differentiated signal is greater than a predetermined level and said window signal exists.

9. A data reproducing circuit for a memory system having a data sensing head, comprising:

an equalizer, operatively connected to receive an analog signal from the data sensing head, varying an amplitude of said analog signal in accordance with a predetermined time, and generating first and second equalized signals from said analog signal, said equalizer comprising:

a first equalizing signal generation circuit generating a first equalized signal f1 expressed by $$f1 = f(t+\tau) - k_1\{f(t) + f(t+2\tau)\}$$

where, f(t) is a signal sensed by the data sensing head, $\tau$ is a delay time, and $k_1$ is a first equalizing gain, said first equalizing signal generation circuit comprising:

a delay circuit having an input terminal and an output terminal, operatively connected to receive said sensed signal, for delaying said sensed signal by said delay time;

a first gain circuit having an input terminal connected to the input terminal of said delay circuit having an output terminal and having said first equalizing gain; and a first subtracting circuit having a first input terminal connected to the output terminal of said delay circuit, and having a high input impedance, whereby the signal from said delay circuit is reflected back to said delay circuit, and having a second input terminal connected to the output terminal of said first gain circuit; and a second equalizing signal generation circuit generating a second equalized signal f2 expressed by $$f2 = f(t+\tau) - k_2\{f(t) + f(t+2\tau)\},$$

where $k_2$ is a second equalizing gain, said second equalizing signal generation circuit comprising:

a second gain circuit, having an input terminal connected to the input terminal of said delay circuit, having an output terminal and having said second equalizing gain; and a second subtracting circuit having a first input terminal connected to the output terminal of said delay circuit, and having a second input terminal connected to the output terminal of said second gain circuit, said delay circuit outputting said first delayed signal $f(t+\tau)$ to the first input terminals of said first and second subtracting circuits, and said second delay signal $f(t+2\tau)$ based upon said reflection signal from the first input terminal of said first subtracting circuit, to the input terminals of said first and second gain circuits, said first gain circuit outputting a signal $k_1 \cdot ft$ and $k_1 \cdot f(t+2\tau)$ to the second input terminal of said first subtracting circuit, said first subtracting circuit subtracting the signal output from said first gain circuit from the signal output from said first delay circuit, sand outputting said first equalizing signal f1, said second gain circuit outputting a signal of $k_2 \cdot f(t)$ and $k_2 \cdot f(t+2\tau)$ to said second input terminal of said second subtracting circuit, said second subtracting circuit subtracting the signal output from said second gain circuit from the signal output from said delay circuit, and outputting said second equalized signal f2;

a digital reproducing circuit, operatively connected to said equalizer, for receiving said first and second equalized signals, for differentiating said first equalized signal, for generating a window signal when and during a time said second equalized signal is greater than a predetermined threshold level, and for outputting a pulsed reproduction signal when said differentiated signal is greater than a predetermined level and said window signal exists.

10. A data reproducing circuit for a memory system having a data sensing head, comprising:

an equalizer, operatively connected to receive an analog signal from the data sensing head, varying an amplitude of said analog signal in accordance with a predetermined time, and generating first and second equalized signals from said analog signals, said equalizer comprising:

a first equalizing signal generation circuit generating a first equalized circuit f1 expressed by $$f1 = f(t+\tau) - k_1\{f(t) + f(t+2\tau)\}$$

where f(t) is a signal sensed by the data sensing head, $\tau$ is a delay time, and $k_1$ is a first equalizing gain, said first equalizing signal generation circuit comprising:

a delay circuit having an input terminal and an output terminal, operatively connected to receive said sensed signal and delaying said sensed signal to said delay time;

the first gain circuit having an input terminal connected to the input terminal of said delay circuit, having an output terminal, and having said first equalizing gain;

a first subtracting circuit having a first input terminal connected to an output terminal of said delay circuit, and having a high input impedance, whereby the signal from said delay circuit is reflected back to said delay circuit, and having a second input terminal connected to an output terminal of said first gain circuit; and a second subtracting circuit having a first input terminal connected to the output terminal of said delay circuit, and having a second input terminal connected to the output terminal of said first gain circuit, said delay circuit outputting said first delayed signal $f(t+\tau)$ to the first input terminals of said first and second subtracting circuits, and said second delay signal $f(t+2\tau)$, based upon said reflection signal from the first input terminal of said first subtracting circuit, to the input terminals of said first and second gain circuits, said first gain circuit outputting a signal of $k_1 \cdot f(t)$ and $k_1 \cdot f(t+2\tau)$ to the second input terminal of said first subtracting circuit, said first subtracting circuit subtracting the signal output from said first gain circuit from the signal output from said first delay circuit, to output of said first equalized signal f1;

a second equalizing signal generation circuit generating a second equalized signal f2 expressed by $$f2 = f(t+\tau) - k_2\{f(t) + f(t+2\tau)\}$$

where $k_2$ is a second equalizing gain, said second equalizing signal generation circuit comprising:

a second gain circuit having an input terminal connected to the input terminal of said delay circuit and having said second equalizing gain, said second gain circuit outputting a signal of $k_2 \cdot f(t)$ and $k_2 \cdot f(t+2\tau)$ to the second input terminal of said second subtracting circuit, and said second subtracting circuit subtracting the signal output from said second gain circuit from the signal output from said delay circuit to output said second equalized signal f2; and a digital data reproducing circuit, operatively connected to said equalizer, for receiving said first and second equalized signals, for differentiating said first equalized signal, for generating a window signal when and during a time said second equalized signal is greater than a predetermined threshold level, and for outputting a pulsed reproduction signal when said differentiated signal is greater than a predetermined level and said window signal exists.

11. An equalizer according to claim 10, wherein said delay circuit comprises an inductor defining said delay time.

* * * * *

UNITED STATES PATENT AND TRADEMARK OFFICE
CERTIFICATE OF CORRECTION

PATENT NO. : 5,068,753

DATED : NOVEMBER 26, 1991

INVENTOR(S) : MASAHIDE KANEGAE

It is certified that error appears in the above-identified patent and that said Letters Patent is hereby corrected as shown below:

TITLE PAGE [56] References Cited

U.S. PATENT DOCUMENTS

Line 1, "4,093,965  6/1978  Gish ..... 360/65X" should be:

--4,081,756  3/1978  Price et al ....
  4,093,965  6/1978  Gish ........... 360/65X
  4,319,288  3/1982  Lee ............--;

TITLE PAGE, Col. 2, after line 4, insert the following:

--FOREIGN PATENT DOCUMENTS 258671   6/1987   Europe.

OTHER PUBLICATIONS

IEEE TRANSACTIONS ON MAGNETICS, Vol. 12, No. 6, November, 1976, pp. 746-748, "Improvement of Recording Density by Means of Cosine Equalizer", Kameyama et al.--.

Col. 2,  line  2, "gain a" should be --gain. A--;
        line 54, "block of" should be --block diagram of--;
        line 64, "block of" should be --block diagram of--.

UNITED STATES PATENT AND TRADEMARK OFFICE
CERTIFICATE OF CORRECTION

PATENT NO. : 5,068,753
DATED : NOVEMBER 26, 1991
INVENTOR(S) : MASAHIDE KANEGAE

It is certified that error appears in the above-identified patent and that said Letters Patent is hereby corrected as shown below:

Col. 4, line 59, "and" (1st occurrence) should be --and is--.
        line 67, "made" should be deleted.

Col. 6,   line 13, "of" should be deleted;
        line 19, "of" should be deleted;
        line 35, "to," should be --to--.

Col. 8,   line 6, "reproduced" should be --reproduction--;
        line 56, "of" should be deleted.

Col. 10, line 3, "first-" should be --first--.

Col. 14, line 22, "as" should be --is--.

Col. 16, line 10, "sand" should be --and--.

Col. 17, line 11, "of" should be deleted.

Signed and Sealed this

Twenty-second Day of June, 1993

Attest:

MICHAEL K. KIRK

*Attesting Officer*      *Acting Commissioner of Patents and Trademarks*